US011626997B2

(12) United States Patent
Semenovskiy et al.

(10) Patent No.: US 11,626,997 B2
(45) Date of Patent: Apr. 11, 2023

(54) SYSTEM AND METHOD FOR AUTHENTICATING DIGITALLY SIGNED DOCUMENTS

(71) Applicant: Vaultie Inc., Toronto (CA)

(72) Inventors: Dmitry Semenovskiy, Toronto (CA); Meyer Mechanic, Toronto (CA)

(73) Assignee: Vaultie, Inc., Toronto (CA)

( * ) Notice: Subject to any disclaimer, the term of this patent is extended or adjusted under 35 U.S.C. 154(b) by 142 days.

(21) Appl. No.: 16/811,342

(22) Filed: Mar. 6, 2020

(65) Prior Publication Data

US 2021/0281421 A1 Sep. 9, 2021

(51) Int. Cl.
*H04L 9/32* (2006.01)
*H04L 9/06* (2006.01)
(Continued)

(52) U.S. Cl.
CPC ......... *H04L 9/3247* (2013.01); *G06Q 20/363* (2013.01); *H04L 9/0643* (2013.01);
(Continued)

(58) Field of Classification Search
CPC ... H04L 9/3247; H04L 9/0643; H04L 9/3231; H04L 9/3263; H04L 9/0861;
(Continued)

(56) References Cited

U.S. PATENT DOCUMENTS 7,216,083 B2 * 5/2007 Parmelee .............. H04L 9/3247
705/64
9,749,140 B2 8/2017 Oberhauser et al.
(Continued)

FOREIGN PATENT DOCUMENTS

CN 109146481 A * 1/2019 ......... G06Q 20/3674
CN 109639651 A 4/2019
(Continued)

OTHER PUBLICATIONS

Cygnature. "How Cygnature Works". Cygnature Workflows for Document and Systems. Aug. 13, 2019.
(Continued)

*Primary Examiner* — Shahriar Zarrineh
(74) *Attorney, Agent, or Firm* — Forsgren Fisher; James M. Urzedowski; Daniel A. Tysver

(57) ABSTRACT

A system and method for authenticating a digitally signed document by one or more users includes a user processor to execute a user facing application to collect and transmit user data associated with the users. The system also includes a KYC Provider subsystem, including a KYC Provider database, and a KYC Provider processor to electronically receive the user data from the user processor and to automatically compare the user data and the verified user data to generate a KYC Provider report. An administrator processor electronically receives the user data from the user processor and the KYC Provider report from the KYC Provider processor to automatically: inspect the KYC Provider report to verify the identity of the one or more users; apply a digital signature of the one or more users to a document; issue an authenticity report associated with the signed document; and publish the authenticity report to a database.

22 Claims, 15 Drawing Sheets

(51) Int. Cl.
  *G06Q 20/36* (2012.01)
  *H04L 9/08* (2006.01)
  *H04L 9/00* (2022.01)

(52) U.S. Cl.
  CPC .......... *H04L 9/0861* (2013.01); *H04L 9/3231* (2013.01); *H04L 9/3263* (2013.01); *G06Q 2220/00* (2013.01); *H04L 9/50* (2022.05); *H04L 2209/56* (2013.01)

(58) Field of Classification Search
  CPC ............ H04L 2209/38; H04L 2209/56; G06Q 20/363; G06Q 2220/00
  See application file for complete search history.

(56) References Cited

U.S. PATENT DOCUMENTS

| | | | | |
|---|---|---|---|---|
| 9,824,198 | B2* | 11/2017 | Carroll | G06F 21/316 |
| 10,102,526 | B1* | 10/2018 | Madisetti | G06Q 20/389 |
| 10,248,783 | B2 | 4/2019 | Costa Faidella et al. | |
| 10,419,420 | B2* | 9/2019 | Steeves | H04L 9/006 |
| 10,637,665 | B1* | 4/2020 | Sundaresan | H04L 63/083 |
| 10,873,578 | B1* | 12/2020 | Rose | H04L 63/1416 |
| 11,122,036 | B2* | 9/2021 | Bhatt | H04L 63/0861 |
| 2002/0150241 | A1* | 10/2002 | Scheidt | H04L 9/3033 |
| | | | | 713/180 |
| 2007/0086061 | A1* | 4/2007 | Robbins | H04N 1/32133 |
| | | | | 358/1.15 |
| 2007/0110235 | A1* | 5/2007 | Pruitt | H04L 9/32 |
| | | | | 380/54 |
| 2007/0204164 | A1* | 8/2007 | Cattrone | H04N 1/32144 |
| | | | | 713/176 |
| 2008/0222049 | A1* | 9/2008 | Loomis | G06Q 20/4012 |
| | | | | 705/75 |
| 2008/0249928 | A1* | 10/2008 | Hill | G06Q 40/00 |
| | | | | 705/39 |
| 2010/0228576 | A1* | 9/2010 | Marti | G06Q 10/02 |
| | | | | 715/764 |
| 2012/0125997 | A1* | 5/2012 | Burra | G06K 19/10 |
| | | | | 235/494 |
| 2012/0263343 | A1* | 10/2012 | Simske | G06V 20/80 |
| | | | | 382/100 |
| 2012/0308003 | A1* | 12/2012 | Mukherjee | H04L 9/3247 |
| | | | | 380/243 |
| 2013/0215275 | A1* | 8/2013 | Berini | G06F 21/32 |
| | | | | 348/150 |
| 2014/0258123 | A1* | 9/2014 | Fernandes | G06Q 20/4014 |
| | | | | 705/44 |
| 2015/0215316 | A1* | 7/2015 | Zeljkovic | H04L 63/0884 |
| | | | | 726/6 |
| 2015/0332082 | A1 | 11/2015 | King | |
| 2016/0232734 | A1* | 8/2016 | Guajardo Merchan | G07D 7/004 |
| 2016/0267369 | A1* | 9/2016 | Picard | G06K 19/06037 |
| 2016/0283920 | A1 | 9/2016 | Fisher et al. | |
| 2017/0250820 | A1* | 8/2017 | Raduchel | G06F 21/6272 |
| 2017/0317833 | A1* | 11/2017 | Smith | H04L 9/3066 |
| 2017/0317997 | A1* | 11/2017 | Smith | G06Q 20/3829 |
| 2018/0115426 | A1* | 4/2018 | Andrade | H04L 9/30 |
| 2018/0152297 | A1 | 5/2018 | Fielding et al. | |
| 2018/0176017 | A1* | 6/2018 | Rodriguez | H04L 63/20 |
| 2018/0181964 | A1* | 6/2018 | Zagarese | G06Q 20/40145 |
| 2018/0191695 | A1* | 7/2018 | Lindemann | H04L 63/0853 |
| 2018/0253539 | A1 | 9/2018 | Minter et al. | |
| 2018/0285879 | A1 | 10/2018 | Gadnis et al. | |
| 2018/0343120 | A1* | 11/2018 | Andrade | H04L 9/0866 |
| 2018/0373859 | A1* | 12/2018 | Ganong | H04L 9/3271 |
| 2019/0020468 | A1* | 1/2019 | Rosenoer | H04L 63/0414 |
| 2019/0035018 | A1 | 1/2019 | Nolan et al. | |
| 2019/0138867 | A1* | 5/2019 | Vander Aa | G06K 19/0614 |
| 2019/0205881 | A1* | 7/2019 | Borzilleri | G06Q 20/36 |
| 2019/0213430 | A1 | 7/2019 | Schwartz | |
| 2019/0319948 | A1* | 10/2019 | Triola | H04L 9/3218 |
| 2019/0340369 | A1* | 11/2019 | Hadi | H04L 9/0637 |
| 2019/0342102 | A1* | 11/2019 | Hao | H04L 9/3247 |
| 2019/0347434 | A1 | 11/2019 | Kinsel et al. | |
| 2019/0386833 | A1* | 12/2019 | Alger | G06F 7/24 |
| 2020/0058214 | A1* | 2/2020 | Darnell Muppirala | G06K 9/00892 |
| 2020/0059368 | A1* | 2/2020 | Stow | G06K 1/121 |
| 2020/0081549 | A1* | 3/2020 | Aggarwal | H04L 63/0861 |
| 2020/0145219 | A1* | 5/2020 | Sebastian | G06F 21/32 |
| 2020/0269861 | A1* | 8/2020 | Liftman | G05D 1/0214 |
| 2020/0327356 | A1* | 10/2020 | Raj | G06K 9/00483 |
| 2020/0387586 | A1* | 12/2020 | Wutscher | G06F 21/32 |
| 2021/0006415 | A1* | 1/2021 | Sun | G06K 9/00906 |
| 2021/0036865 | A1* | 2/2021 | Young | H04L 9/30 |
| 2021/0089635 | A1* | 3/2021 | Weeresinghe | G06Q 20/40145 |
| 2021/0110015 | A1* | 4/2021 | McCarty | G06K 9/00355 |
| 2021/0150036 | A1* | 5/2021 | Kaneko | H04L 63/08 |
| 2021/0234702 | A1* | 7/2021 | Bekiyants | A43B 1/14 |
| 2021/0272123 | A1* | 9/2021 | Burke | G06Q 20/40145 |
| 2021/0281421 | A1* | 9/2021 | Semenovskiy | H04L 9/3247 |
| 2021/0377263 | A1* | 12/2021 | Law | G06F 21/32 |
| 2022/0060335 | A1* | 2/2022 | Pinedo Hoyvik | H04L 9/3247 |

FOREIGN PATENT DOCUMENTS

| | | | | |
|---|---|---|---|---|
| CN | 111144862 A | * | 5/2020 | |
| CN | 113221141 A | * | 8/2021 | G06F 21/602 |
| KR | 102044747 B1 | | 11/2019 | |
| KR | 2020144829 A | * | 12/2020 | |
| KR | 2021041980 A | * | 4/2021 | |
| KR | 2021041984 A | * | 4/2021 | |
| WO | WO-2012053817 A2 | * | 4/2012 | G06F 21/36 |
| WO | WO-2014062093 A1 | * | 4/2014 | G06F 21/36 |
| WO | WO-2016128567 A1 | * | 8/2016 | G06F 21/33 |
| WO | 2018176140 A1 | | 10/2018 | |
| WO | 2019030445 A1 | | 2/2019 | |
| WO | 2019032113 A1 | | 2/2019 | |
| WO | 2019179534 A2 | | 9/2019 | |
| WO | 2019224384 A1 | | 11/2019 | |

OTHER PUBLICATIONS

Shobadge. "How ShoCard Works". Learn How ShoBadge Enterprise SSO and MFA Works. Aug. 13, 2019.

"ShowCard Launches Document Signing with Proof of Signing on the Blockchain". Globe NewsWire. Apr. 25, 2019. Cupertino, CA.

Frudatum. "Register and Authenticate any Type of File". Aug. 13, 2019.

PCT International Search Report for International Application No. PCT/CA2021/050291, dated Jun. 10, 2021.

* cited by examiner

SYSTEM AND METHOD FOR AUTHENTICATING DIGITALLY SIGNED DOCUMENTS

FIELD OF THE INVENTION

The present invention relates generally to a digital signature system and method, and more particularly to a system and/or method for authenticating digitally signed documents.

BACKGROUND OF THE INVENTION

A legal digital signature typically includes a digital signature hash validated against an organization's authentication infrastructure. This type of signature is generally accepted as providing the same legal standing as a handwritten signature for certain types of documents allowed by a regulator to be signed digitally if it adheres to the requirements of the specific regulation it was created under (e.g., eIDAS, NIST-DSS, ZertES). Digital signatures may be used in e-commerce and in regulatory filings to implement electronic signatures in a cryptographically protected way.

Various point-to-point secure communication protocols in the prior art may provide cryptographic endpoint authentication for applications that communicate within client-server based networks for preventing eavesdropping, tampering, and message forgery during communications. SSH ("Secure Shell" or "Secure Socket Shell") is a set of standards and associated network protocols that allow for establishing a secure channel between a local and a remote computer. This protocol uses public-key cryptography to authenticate the remote computer.

Various ways of placing e-signatures on documents are known in the prior art. Adobe's PDF documents, for example, can be electronically signed by placing signature images, e.g., handwritten signatures or name in handwritten font, within documents. DocuSign uses a system and method for approvals of agreements based on e-signatures.

A verifiable credential is a tamper-evident credential that has authorship that can be cryptographically verified. The claims in a credential can be about different subjects. The detailed data model of Verifiable Credentials is proposed by W3C (https://www.w3.org/TR/vc-data-model/#what-is-a-verifiable-credential). Upon issuance, a Verifiable Credential is signed using one of the signature suites that are specified by W3C with the details on how to produce and verify the cryptographic signature.

A Decentralized Identifier ("DID") is a unique identifier that is associated with an identity, such as a person or an organization. This DID serves as a pointer to the DID document, which is stored in a decentralized fashion and contains a set of public keys, used by the subject person or organization to produce cryptographic signatures and for third-party verifiers to validate the signature afterwards.

Various methods of producing and managing a DID exist in the prior art.

Blockchain technology is known in the prior art. A blockchain is a continuously growing list of records, called blocks, which are linked and secured using cryptography. By design, blockchains are inherently resistant to modification of the data. A blockchain can serve as a distributed ledger that can record transactions between two parties efficiently and in a verifiable and permanent way. The advantage of blockchain infrastructure compared to centralized infrastructures, such as Public Key Infrastructure ("PKI"), that use central ledgers is that a blockchain is harder to compromise because distributed hash ledgers are used.

Distributed peer-to-peer filesystems are known in the prior art. The InterPlanetary File System ("IPFS") provides high throughput content-addressed block storage model, with content-addressed hyperlinks. IPFS combines a distributed hash table, an incentivized block exchange, and a self-certifying namespace. Advantages of IPFS are that it has no single point of failure and nodes do not need to trust each other.

Various systems and methods of facial recognition using artificial intelligence are similarly known in the prior art. In general, such system and methods work by comparing selected facial features from given images of faces.

A limitation of digital signatures in the prior art is that when digitally signing a document, currently there is no way to definitively prove that a specific signatory, in fact, signed a document. Digital signatures may be classified into two categories, one is a "unique marking", by which one uploads a copy of their physical signature to a document, and the other is predicated around key pairs, which authenticates an account and are able to authenticate that a document came from a specific account. In both cases, one can prove a document appeared to be signed through a user's account or by a user, but neither could definitively prove that a user is the person signing the document while in his account. The resulting porousness creates a plausible deniability that any individual, in fact, signed a document, particularly when the major barrier to entry into a digital document signature account is just a password or some verification questions which are both potentially accessible information.

With the expansion of legal services into digital space (e.g., digital wills and e-filing systems), there exists a need to enhance current approaches to document and signatory authentication and linking digital signature on the document with the signer's identity. More specifically, there is a need for a system and/or method of overcoming one or more limitations associated with the prior art by producing an instantly verifiable digital signature on the document that is associated with the identity of the signatory and this association can be verified.

SUMMARY OF THE INVENTION

According to an embodiment of the invention, there is provided a system for authenticating a digitally signed document by one or more users. The system includes a user processor, local to the one or more users, operative to execute a user facing application to collect and transmit user data associated with the one or more users. Further included is a KYC Provider subsystem that includes: (i) a KYC Provider database containing verified user data associated with the one or more users; and (ii) a KYC Provider processor operative to electronically receive the user data from the user processor, and to automatically compare the user data and the verified user data to generate a KYC Provider report. An administrator processor is also provided that is operative to electronically receive the user data from the user processor and the KYC Provider report from the KYC Provider processor and to automatically: (i) inspect the KYC Provider report to verify the identity of the one or more users; (ii) apply a digital signature of the one or more users to a document; (iii) issue an authenticity report associated with the signed document; and (iv) publish the authenticity report to a database.

In an additional feature, the system further includes a decentralized storage as the database.

In another feature, the system also includes a biometric reader operative to capture, from the user, biometric information associated with the user, which is collected as a portion of the user data.

In still another feature of the system, the user data is encrypted.

In yet another feature of the system, the user facing application is further adapted to generate an encrypted wallet and a DID associated with a blockchain address assigned to the wallet and the signed document.

According to a further embodiment, there is also provided a method for authenticating a digitally signed document by one or more users. The method includes: operating a user processor, local to the one or more users, to execute a user facing application to collect and transmit user data associated with the one or more users; using a KYC Provider subsystem comprising: (i) a KYC Provider database containing verified user data associated with the one or more users; and (ii) a KYC Provider processor to electronically receive the user data from the user processor, and to automatically compare the user data and the verified user data to generate a KYC Provider report; and operating an administrator processor to electronically receive the user data from the user processor and the KYC Provider report from the KYC Provider processor and to automatically: (i) inspect the KYC Provider report to verify the identity of the one or more users; (ii) apply a digital signature of the one or more users to a document; (iii) issue an authenticity report associated with the signed document; and (iii) publish the authenticity report to a database.

In an additional feature, the database is a decentralized storage.

In another feature, the method further includes a biometric reader that is used to capture, from the user, biometric information associated with the user, which is collected as a portion of the user data.

In yet another feature, the method provides that the user processor, the KYC Provider subsystem and/or the administrator processor are operative to automatically encrypt and/or decrypt the user data.

In still another feature, the method further includes an account creation step of using the user facing application to (i) generate an encrypted wallet, and (ii) generate a DID associated with a blockchain address assigned to the wallet and the signed document.

In an additional feature, the method includes a document processing step wherein the user processor is further operative to (i) generate a unique file key for each of the documents, (ii) encrypt each document with the corresponding file key, and (iii) generate a shared secret between encrypted wallets.

In another feature, the method includes a step of generating a signatory credential comprising an ECDSA signature of the user, the type of document, the location of verification, biometric information of the user, name of the, and/or blockchain address of the document.

In still another feature, the authenticity report is encrypted with a unique certificate key associated with each signing user of the document.

According to a further embodiment, there is provided a non-transitory computer readable medium on which is physically stored executable instructions which, upon execution, will authenticate a digitally signed document by one or more users. The executable instructions include processor instructions for a user processor, a KYC Provider processor and/or an administrator processor to automatically: (a) collect and/or electronically communicate user data associated with the one or more users from the user processor to the KYC Provider processor and/or the administrator processor; (b) compare the user data received from the user processor with the verified user data stored in a KYC Provider database and automatically generate a KYC Provider report; and (c) automatically inspect the KYC Provider report to verify the identity of the one or more users, apply a digital signature of the one or more users to a document, issue an authenticity report associated with the signed document, and publish the authenticity report to a database.

Other advantages, features and characteristics of the present invention, as well as methods of operation and functions of the related elements of the apparatus and method, and the combination of steps, parts and economies of manufacture, will become more apparent upon consideration of the following detailed description and the appended claims with reference to the accompanying drawings, the latter of which are briefly described herein below.

BRIEF DESCRIPTION OF THE DRAWINGS

The novel features which are believed to be characteristic of the system and method according to the present invention, as to their structure, organization, use, and method of operation, together with further objectives and advantages thereof, will be better understood from the following drawings in which presently preferred embodiments of the invention will now be illustrated by way of example. It is expressly understood, however, that the drawings are for the purpose of illustration and description only, and are not intended as a definition of the limits of the invention. In the accompanying drawings.

DETAILED DESCRIPTION OF THE PREFERRED EMBODIMENTS

Figure 1:
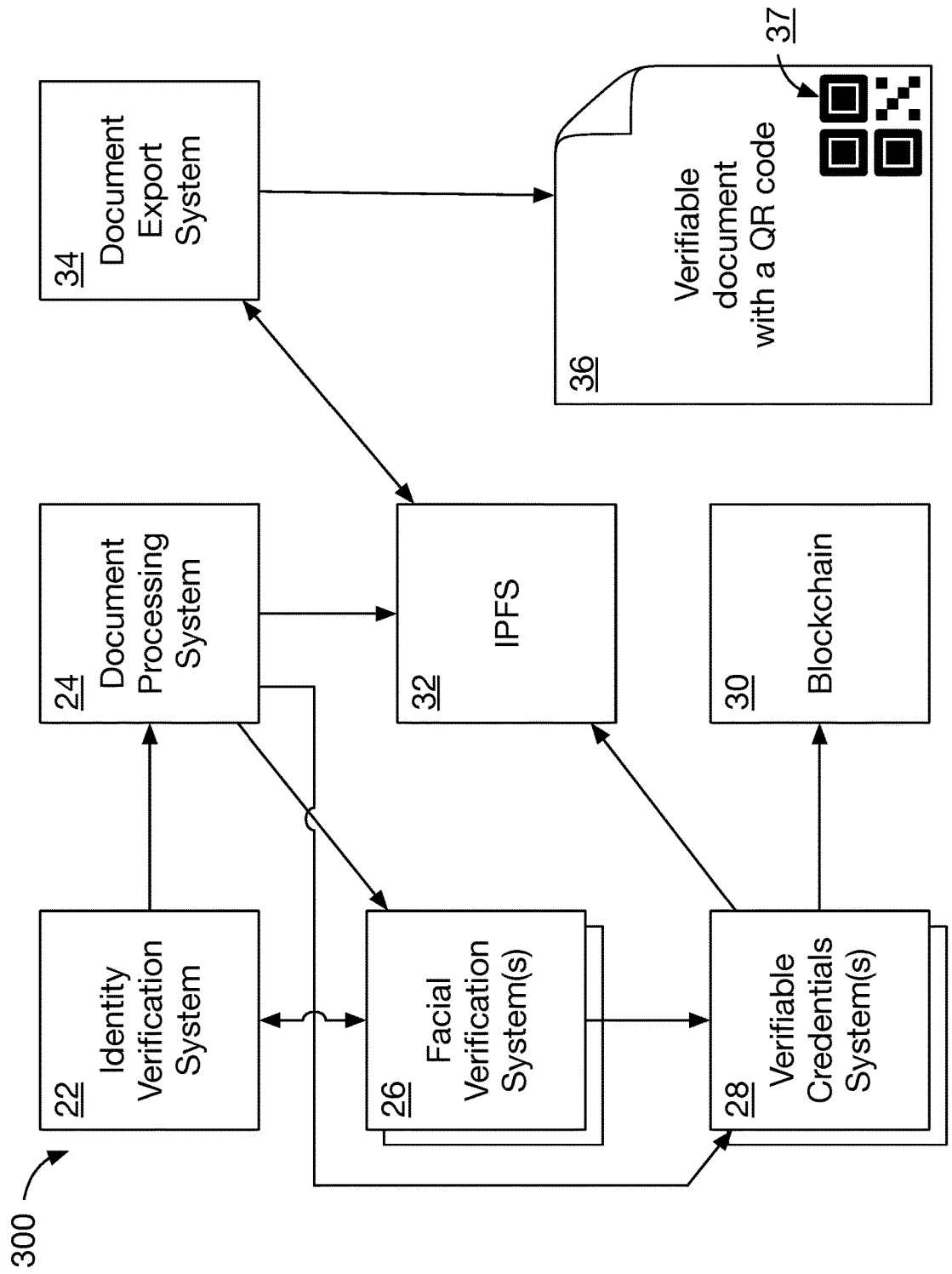
FIG. 1 is a schematic diagram of a system for producing an authenticatable digital signature on a document in accordance with a preferred embodiment.

The description that follows, and the embodiments described therein, is provided by way of illustration of an example, or examples, of particular embodiments of the principles of the present invention. These examples are provided for the purposes of explanation, and not of limitation, of those principles and of the invention. In the description, like parts are marked throughout the specification and the drawings with the same respective reference numerals. The figures are not to scale, and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present invention.

As used herein, a person skilled in the relevant art may generally understand the term "comprising" to generally mean the presence of the stated features, integers, steps, or components as referred to in the claims, but that it does not preclude the presence or addition of one or more other features, integers, steps, components or groups thereof.

It should also be appreciated that the present invention can be implemented in numerous ways, including as a system, a device, a method, or a computer readable medium wherein program instructions are sent over a network. In this specification, these implementations, or any other form that the invention may take, may be referred to as processes or methods. In general, the order of the steps of the disclosed processes may be altered within the scope of the invention.

In order that the invention may be more fully understood, it will now be described, by way of example, with reference to the accompanying drawings in which FIG. 1 through FIG. 14 illustrate embodiments of the present invention.

Figure 13:
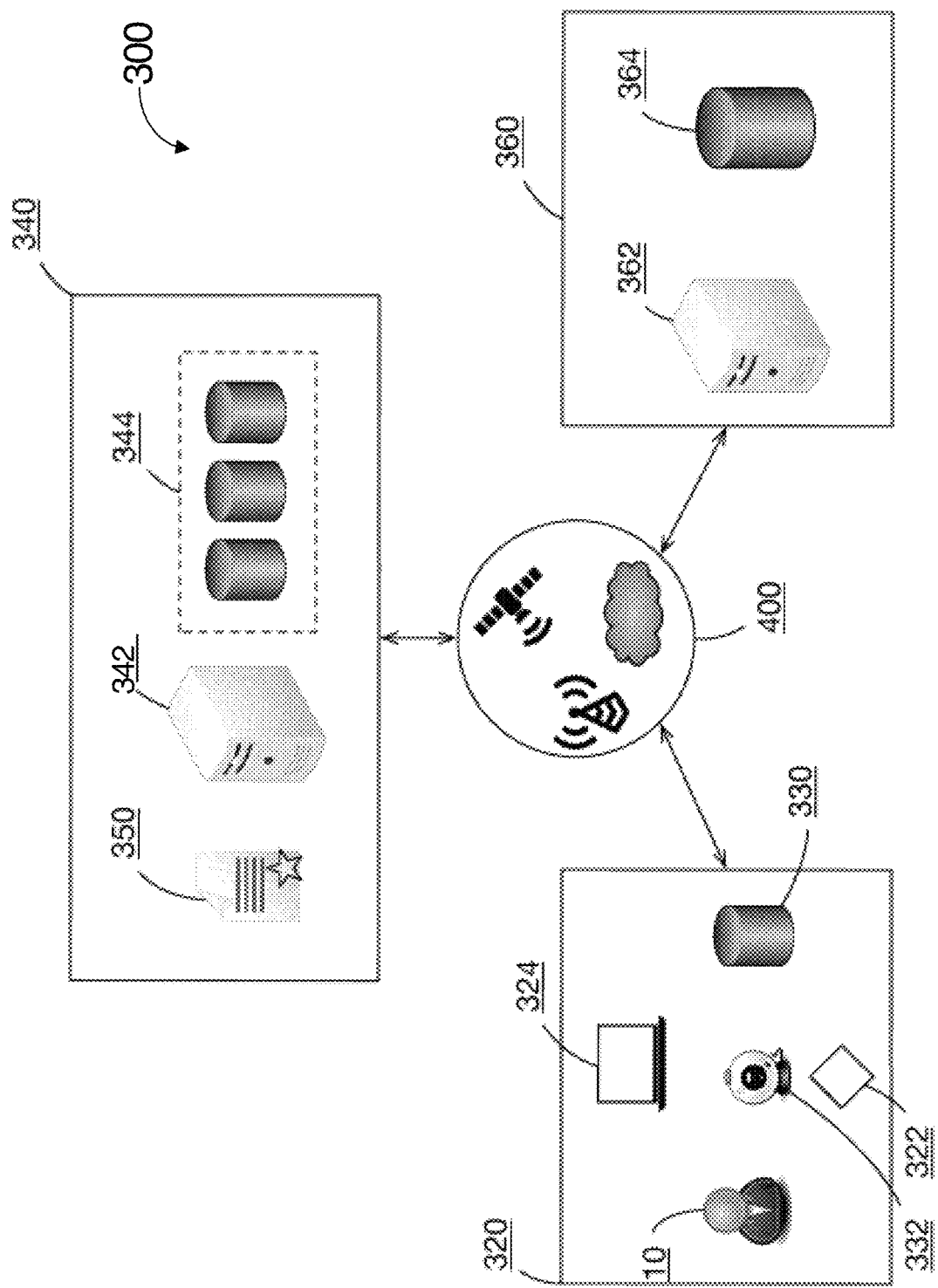
FIG. 13 is a schematic diagram of a system according to a preferred embodiment.

Referred to FIG. 13, there is shown a system 300 for use with a user subsystem 320, an administrator subsystem 340, and a KYC Provider subsystem 360. Some parts of the system 300 depicted in FIG. 13 may be provided at a remote location.

Figure 14:
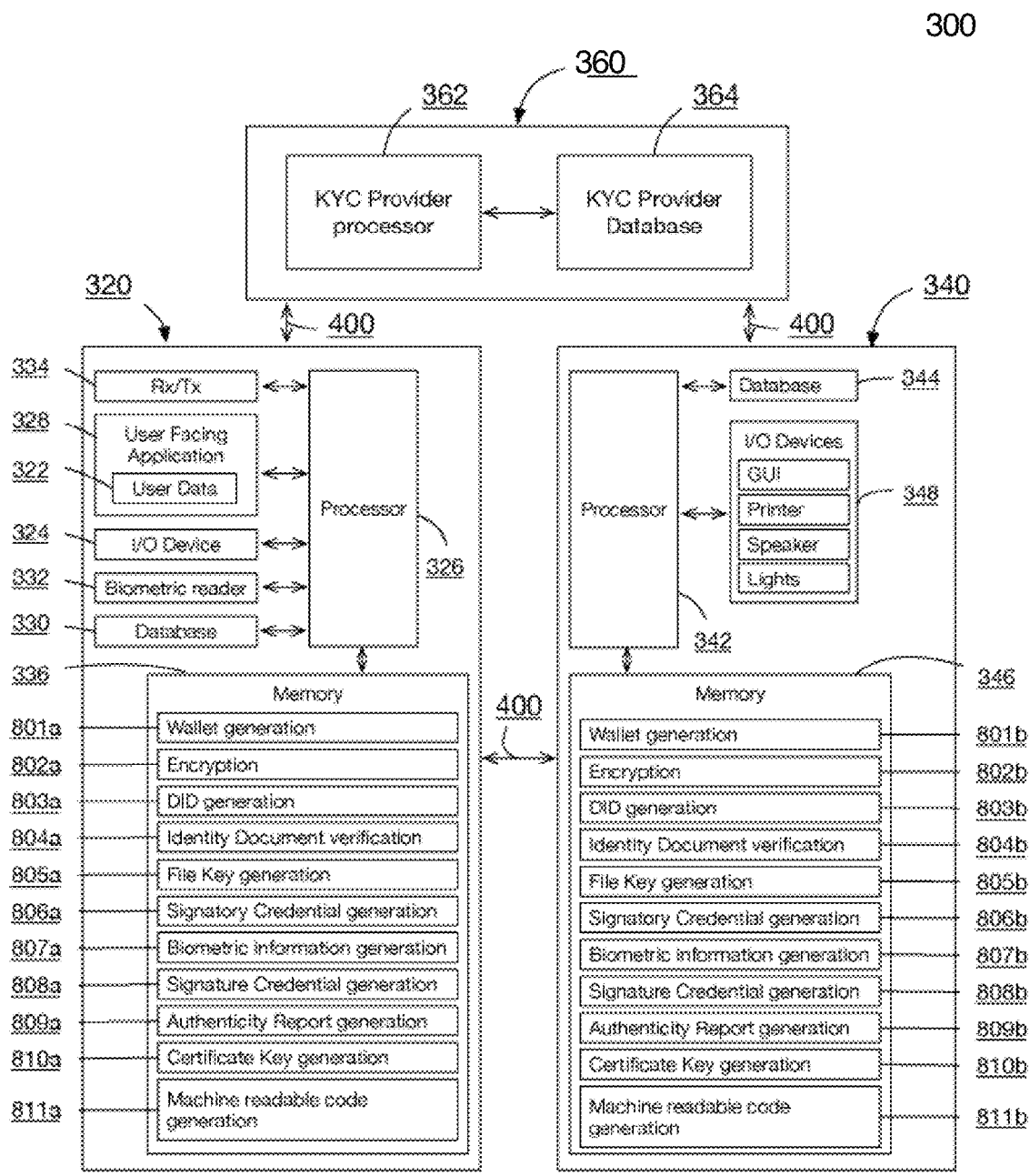
FIG. 14 is a schematic diagram of components of the system of FIG. 13.

In FIGS. 13 and 14, the system 300 is shown in use with a communication network 400. The communication network 400 may include satellite networks, terrestrial wireless networks, the Internet, and cloud computing platforms. The communication of data (including, for example user data 322) between the user subsystem 320, the administrator subsystem 340, and the KYC Provider subsystem 360 may also be achieved via one or more wired means of transmission or other physical means (e.g., a Universal Serial Bus cable and/or flash drive) of transmission. Persons having ordinary skill in the art will appreciate the system includes hardware and software.

FIGS. 13 and 14 further schematically illustrate, among other things, that the user 10 subsystem 320 includes a user input-output device 324 (e.g., for entering user data 322), a user processor 326 operative to execute a user facing application 328, a user database 330, a biometric reader 332, a transmitter-receiver 334, and computer readable medium 336 (e.g., a processor-readable memory) local to the user 10. The administrator subsystem 340 includes an administrator processor 342, an administrator database 344, and a computer readable medium 346 (e.g., a processor-readable memory) local to the administrator processor 342. The KYC Provider subsystem 360 includes a KYC Provider processor 362 and a KYC Provider database 364 local to, or remote from, the KYC Provider processor 362.

User Subsystem

As best seen in FIG. 14, the user subsystem 320 includes the user input-output device 324 (as shown in FIG. 13), the user processor 326 operative to execute the user facing application 328 and the biometric reader 332 for receiving biometric information (e.g., facial image) associated with the user 10. The user facing application 328 is preferably adapted to collect user data 322 including, but not limited to, a password, identity support document, user contact information. The user facing application 328 is preferably software. The biometric reader 332 may be a stand-alone device (e.g., web camera, fingerprint reader, retinal scanner, etc.) or integrated with the user input-output device 324.

Preferably, the user 10 inputs information associated with identity establishment into the user input-output device 324 to thus collect the user data 322. The user data 322 may additionally include the biometric information of the user (e.g., facial image).

Following collection of the user data 322, the user processor 326 preferably transmits the user data 322 to the administrator processor 342 and/or the KYC Provider processor 362.

For wireless communication with the administrator processor 342 and/or the KYC Provider processor 362, the user processor 326 preferably leverages the communication network 400.

In preferable embodiments, the system 300 may include more than one user subsystem 320 (e.g., multiple users or signatories).

Administrator Subsystem

As best seen in FIG. 14, the administrator subsystem 340 includes the administrator processor 342, the administrator database 344 (e.g., preferably a decentralized storage system such as the InterPlanetary File System), a computer readable medium 346, and administrator input/output devices 348 (e.g., a printer for generating reports, speaker, graphical user interface, lights, etc.).

Preferably, the administrator processor 342 communicates via the communication network 400 with the user processor 326 and/or the KYC Provider processor 362 to facilitate transmission of the user data 322 thereto. Thereafter or substantially contemporaneously, the administrator processor 342 preferably connects to the user processor 326 and/or the KYC Provider processor 362 via the communication network 400. The user processor 326 preferably transmits all, or a predetermined portion of, the user data 322 to the administrator processor 342 and/or the KYC processor 362.

All, or any predetermined portion of, the user data 322 may be transmitted to the administrator database 344.

KYC Provider Subsystem

As best seen in FIG. 13, the KYC Provider subsystem 360 includes, among others, the KYC Provider processor 362 and the KYC Provider database 364.

Processors

Preferably, the processors 326, 342—i.e., the user processor 326 and/or the administrator processor 342—are operatively encoded with one or more algorithms 801a, 801b, 802a, 802b, 803a, 803b, 804a, 804b, 805a, 805b, 806a, 806b, 807a, 807b, 808a, 808b, 809a, 809b, 810a, 810b, and/or 811a, 811b (shown schematically in FIG. 14 as being stored in the memory associated with the user subsystem 320 and/or the administrator subsystem 340) which provide the processors 326, 342 with wallet generation logic 801a, 801b, encryption logic 802a, 802b, decentralized identifier generation logic 803a, 803b, identity support document verification logic 804a, 804b, file key generation logic 805a, 805b, signatory credential generation logic 806a, 806b, biometric information verification logic 807a, 807b, signature credential generation logic 808a, 808b, authenticity report generation logic 809a, 809b, certificate key generation logic 810a, 810b, and machine readable code generation logic 811a, 811b. Preferably, the algorithms 801a, 801b, 802a, 802b, 803a, 803b, 804a, 804b, 805a, 805b, 806a, 806b, 807a, 807b, 808a, 808b, 809a, 809b, 810a, 810b, and/or 811a, 811b enable the processors 326, 342 to generate a blockchain wallet for a user, verify the identity of a user, facilitate digital signing of documents following identity verification. The user processor 326 and/or administrator processor 342 are also preferably operatively connected to one or more power sources.

The user processor 326 is preferably in communication with the administrator processor 342 and/or the KYC Provider processor 362. Preferably, the user processor 326 may be used to automatically: (i) collect user data associated with the user (including biometric information); (ii) generate a unique file key; (iii) issue signatory credentials; and/or (iv) issue signature credentials. Persons skilled in the art will appreciate that conducting the foregoing steps minimizes potential security vulnerabilities (e.g., access to sensitive user information by an unauthorized third party) by maintaining a peer-to-peer computing or networking environment.

The administrator processor 342 is preferably in communication with the user processor 326 and/or the KYC Provider processor 362. Preferably, the administrator processor 342 may be used to automatically: (i) encrypt/decrypt user data; (ii) verify the identity of a user (or signatory); (iii) generate a unique file key; (iv) generate a certificate key; (v) issue signatory credentials; (vi) issue signature credentials; (vii) issue authenticity reports; (viii) generate a machine readable code; and/or (ix) publish data to a decentralized storage. Preferably, the KYC Provider processor 362 may be used to automatically verify the identity of a user (or signatory).

Database

A preferred embodiment of the present invention provides a system 300 including data storage (e.g., databases 330, 344, 364) that may be used to store all necessary data required for the operation of the system 300. A person skilled in the relevant art may understand that a "data store" refers to a repository for temporarily or persistently storing and managing collections of data which include not just repositories like databases (a series of bytes that may be managed by a database management system (DBMS)), but also simpler store types such as simple files, emails, etc. A data store in accordance with the present invention may be one or more databases, co-located or distributed geographically or cloud-based. The data being stored may be in any format that may be applicable to the data itself, but may also be in a format that also encapsulates the data quality.

Features of the present invention may be implemented on a Blockchain which is a peer-to-peer decentralized open ledger, and may rely on a distributed network shared between its users where everyone holds a public ledger of every transaction carried out using the architecture, which are then checked against one another to ensure accuracy, preferably using one of a variety of cryptographic functions. This ledger is called the "blockchain". Blockchain may be used instead of a centralized third party auditing and being responsible for transactions. The blockchain is a public ledger that records transactions. A novel solution accomplishes this without any trusted central authority: maintenance of the blockchain is performed by a peer-to-peer network of communicating nodes running software. Network nodes can validate transactions, add them to their copy of the ledger, and then broadcast these ledger additions to other nodes. The blockchain is a distributed database; in order to independently verify the chain of ownership or validity of any and every transaction, each network node stores its own copy of the blockchain.

Encryption

Preferably, the user data is encrypted or de-encrypted (or decrypted) for secured transmission by the processors 326, 342 using the encryption algorithm 802a,b. Following transmission, the encrypted data is preferably automatically decrypted by the processors 326, 342 using the encryption algorithm 802a,b.

In accordance with a preferred embodiment, the components of the system 300 of the present invention are adapted to provide a digital signature that includes cryptographic and/or biometric proof that serve to instantly authenticate a document and/or establish the validity of a digital signature by linking it to the real identity of a person (i.e., the signatory).

In a preferred embodiment, the system 300 is adapted to carry out the steps of methods as depicted in FIG. 1, including: (a) an identity verification method 22; (b) a document processing method 24; (c) a facial verification method 26; (d) a verifiable credentials method 28; and (e) a document export method 34. In some preferred embodiments, the system 300 is adapted to utilize one or more external global decentralized platforms such as a decentralized file-subsystem 32 and a blockchain 30. The outcome of the method steps carried out by the system 300 is preferably a digitally signed document 36 including a machine readable code 37 (e.g., a barcode) adapted to encode predetermined verification information.

In a preferred embodiment, when an account is created by a user based on a traditional email/password pair or the OAuth 2.0 standard for access delegation (e.g., social networks login), the system 300 generates a Blockchain wallet for the user. Preferably, the account creation process occurs using a processor local to the user such as the user processor 326 (e.g., in-browser or on the client side) so that user data 322 is not transmitted by the user processor 326 (e.g., the user's computer or user input-output device 324) unless it is encrypted. In a preferable embodiment, the system 300 does not store information in a database that includes user signing keys which enables peer-to-peer document signing.

Account Creation

Figure 9:
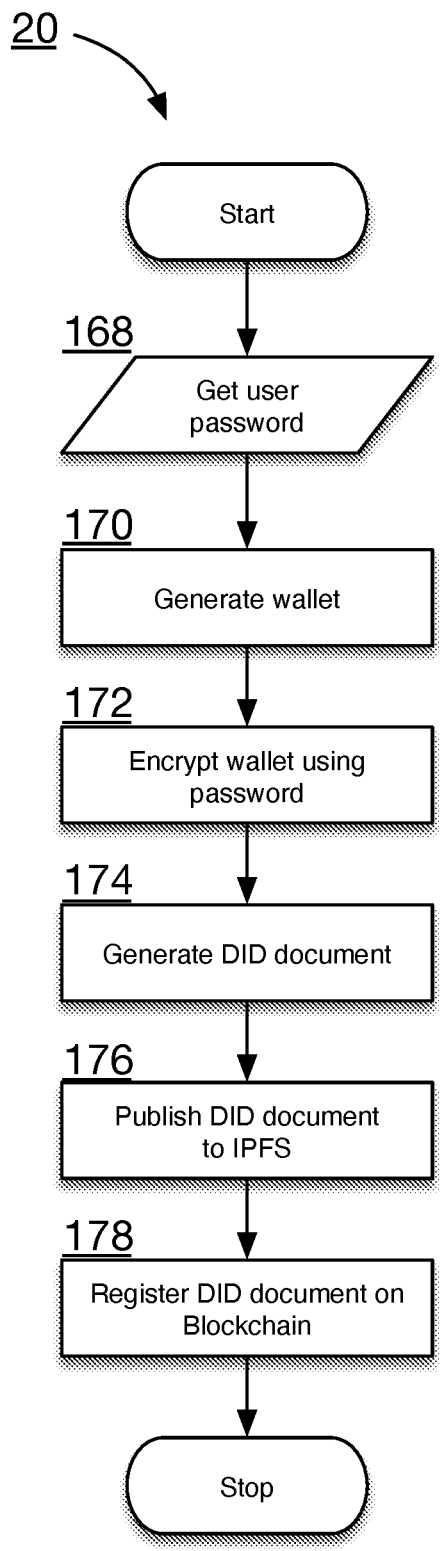
FIG. 9 is a flowchart of a method of an account creation in accordance with a preferred embodiment.

FIG. 9 depicts steps of a method 20 for account creation by a user in accordance with a preferred embodiment. The method 20 includes the following steps: a start step; a step 168 of password collection from the user; a wallet generation step 170; a step 172 of encrypting the wallet using the password; a step 174 of generating a decentralized identifier ("DID"), associated with a blockchain address assigned to the wallet and a DID Document that includes a public key of the wallet; a step 176 of publishing the DID document to a decentralized storage (e.g., InterPlanetary File System or "IPFS"); and a step 178 of permanently storing the address of the DID document on the decentralized storage (e.g., the IPFS address) on blockchain in a transaction input data, which is signed and performed using the wallet.

Identity Verification

Figure 2:
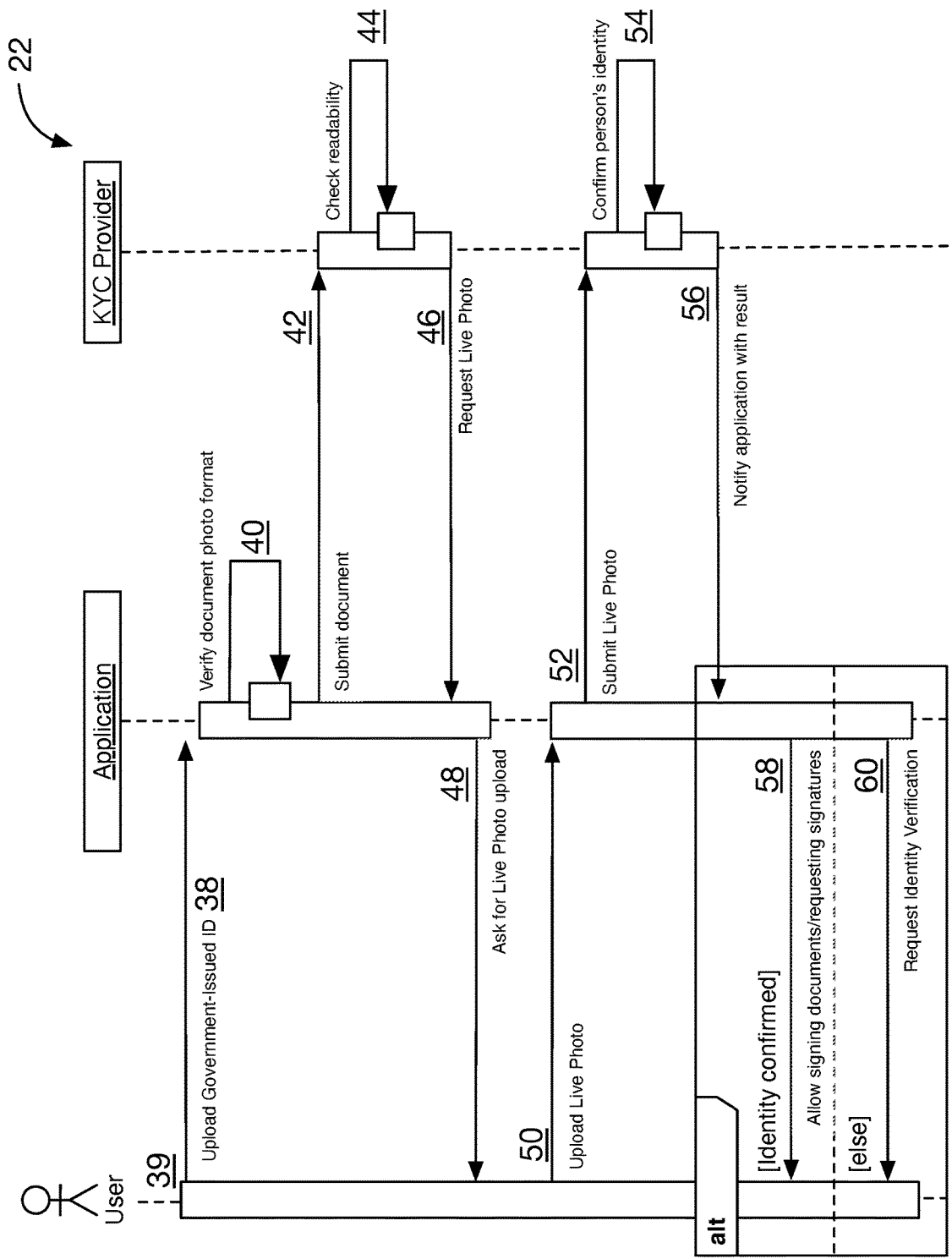
FIG. 2 is a sequence diagram of a workflow for an identity verification system.

FIG. 2 depicts a method 22 of identity verification, including collecting and including information about the signatory in the digital signature, in accordance with a preferred embodiment. The method 22 includes the following steps: a start step; a step 39 of uploading an identity support document 38 of the user (e.g., Government-issued identification) to the system 300; a step 40 of verifying a format and size of the picture including a sub-step of requesting re-uploading of the identity support document if the format or size are not valid based on predetermined criteria; a step 42 of transmitting the identity support document to a Know-Your-Customer ("KYC") Provider upon verification of the format and size of the picture; a readability check step 44 of verifying that the identity support document is machine-readable, which may be performed by the KYC Provider, including a sub-step of presenting a notification and optionally requesting re-uploading of the image or re-taking the photo of the identity support document if any potential issues related to machine-readability are identified; a step 46 of requesting a Live Photo (i.e., a photo of the user taken by a web-camera or a mobile device and transmitted directly or indirectly, or by any other means without modification of the data, to the KYC Provider) from the user subsystem 320 by the KYC Provider if the readability check is successful or the user decides to proceed with the current image; a step 48 of capturing a Live Photo of the user (e.g., using a web camera on a computer local to the user or using a mobile device); and a step 50 of transmitting the Live Photo of the user to the user subsystem 320; a step 52 of transmitting the Live Photo to the KYC Provider; a step 54 of confirming the identity of the user by the KYC Provider; a step 56 of notifying the administrator subsystem 340 of the result of the identity confirmation (e.g., through the generation of a KYC Provider report); a step 58 of granting the user permission to sign a document or request signatures from other users (or signatories) if the result of the identity confirmation is positive (i.e., the person on the photo is confirmed to be the same person on the identity support document and the identity support document is not fake or stolen; and a step 60 of requesting the user to complete, or repeat, identity verification if the result of the identity confirmation is negative. If the identity verification method 22 yields a positive result, the verified profile is linked with the previously registered DID.

Document Processing

Figure 3:
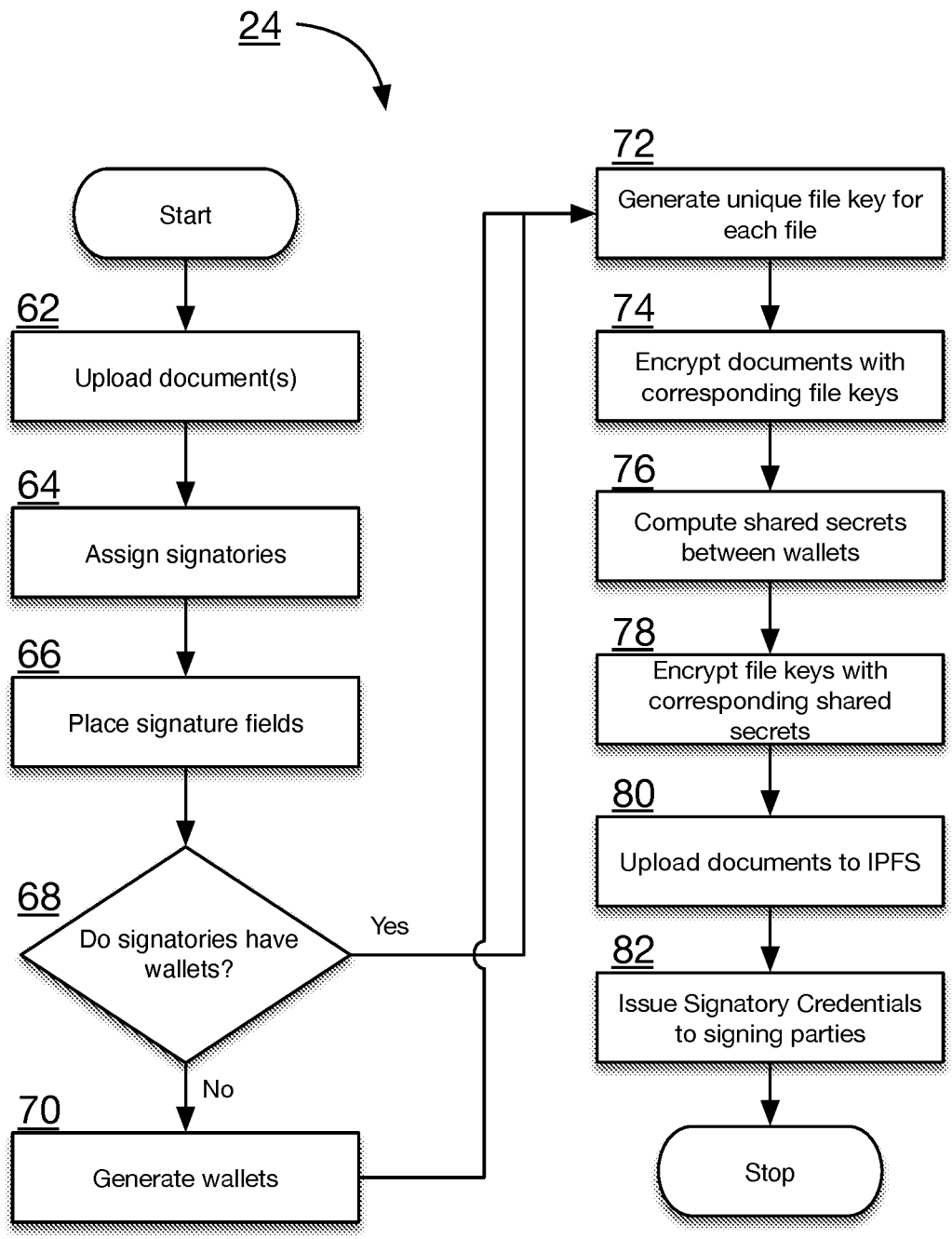
FIG. 3 is a flowchart of a method of sending documents for signing to counterparties using verifiable credentials in accordance with a preferred embodiment.

FIG. 3 depicts a method 24 of document processing. In accordance with a preferred embodiment, the method 24 includes the following steps: a start step; a step 62 of transmitting or uploading a document or a package of documents to the system 300; a step 64 of assigning signatories (alternately "users"), preferably prior to sending out for signature, to facilitate the production of instantly a verifiable blockchain-based digital signature, which involves the use of unique contact information for the signatory that will later serve as a login identification information (e.g., when assigning signatories, email addresses or phone numbers can be used) and is preferably included in a Signatory Credential for verification purposes; a step 66 of placing signature fields which includes providing coordinates and types of signature fields to the administrator subsystem 340 that may generate additional metadata (e.g., number of pages to sign and number of places to sign) included in the Signatory Credential; a step 68 of determining whether the signatories have wallets; a step 70 of generating a wallet if no wallet exists for a given signatory in the system; a step 72 of generating a unique file key for each file; a step 74 of encrypting each document with the corresponding file key (e.g., using an AES-256 algorithm) to protect the privacy of the signing parties; a step 76 of computing shared secrets between wallets; a step 78 of encrypting file keys with corresponding shared secrets, preferably computed for a pair of wallets, as a passphrase; a step 80 of uploading documents to a decentralized content-addressable storage ("CAS") or an InterPlanetary File System ("IPFS") as an implementation of a decentralized CAS where an address that is represented by the content hash is assigned to each file when storing a file on a CAS such as IPFS; and a step 82 of issuing Signatory Credentials to each signatory for each document in a package, which includes the information about signatory's identity (e.g., email or other contact identifier and DID) and information about the document to be signed represented by its IPFS address. Persons skilled in the art will appreciate that the current implementation of Blockchain cryptography is based on Elliptic-Curve Cryptography (secp256k1 curve), which allows for signing transactions and data transfer using the wallet key pair, as well as facilitating a regular private-public key pair and computation of a shared secret using Elliptic-Curve Diffie-Hellman ("ECDH") protocol.

Signatory Credential Generation

Figure 4:
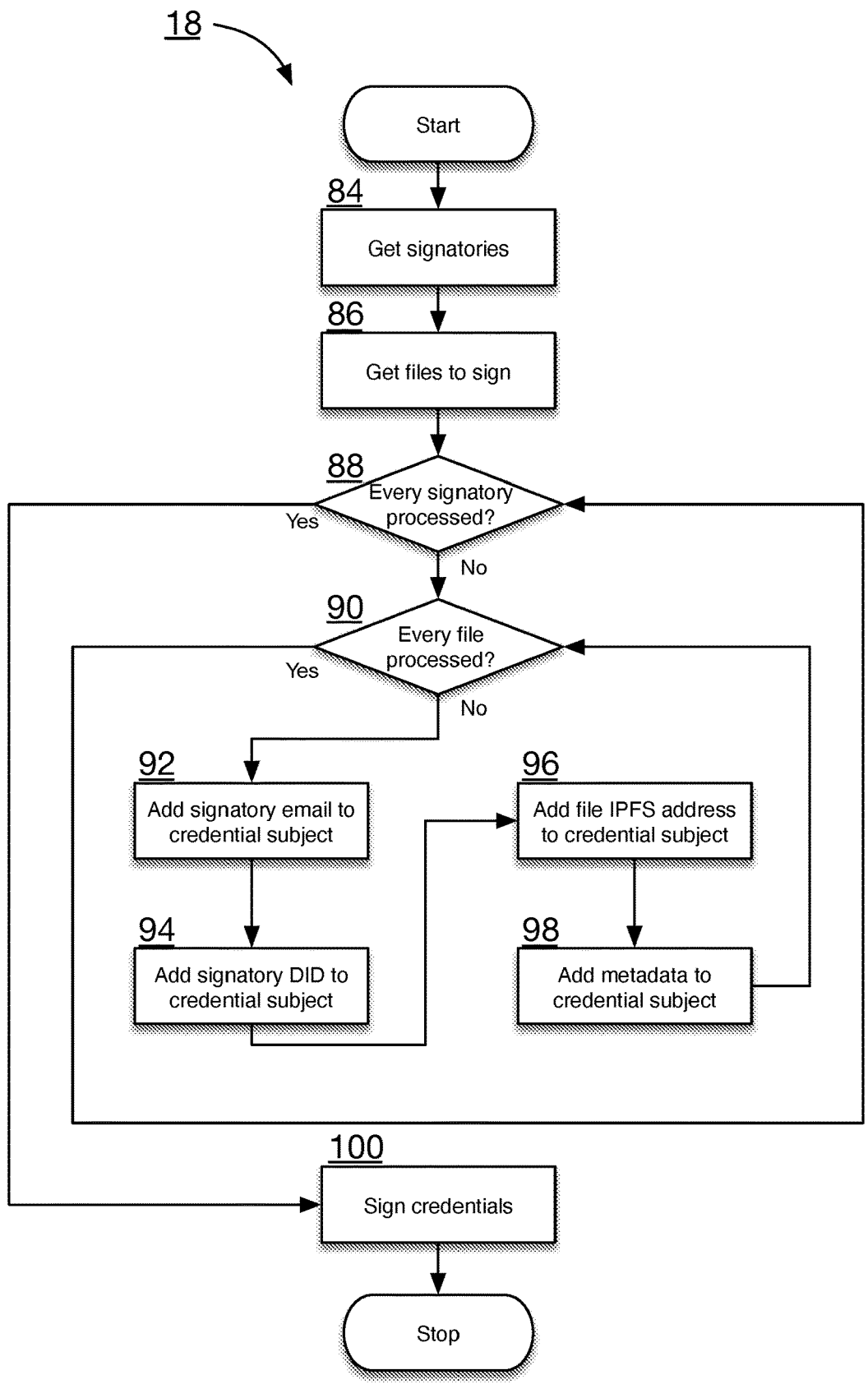
FIG. 4 is a flowchart of a method of issuing a signatory credentials to a document when the document is being sent for signing to counterparties in accordance with a preferred embodiment.

FIG. 4 depicts a method 18 of issuing a signatory credential to a document when the document is being sent for signing to counterparties. In accordance with a preferred embodiment, the method 18 includes the following steps: a start step; a step 84 of getting signatories; a step 86 of getting files of the package for signature; a step 88 of determining if every signatory has been processed; if every signatory has not been processed, a step 90 of determining if every file of the package has been processed; if every file of the package has not been processed, a step 92 of adding a signatory email to the credential subject; a step 94 of adding a signatory DID to the credential subject; a step 96 of adding a file IPFS address to the credential subject; a step 98 of adding metadata to the credential subject (e.g., total pages of the document along with additional optional metadata such as total number of signatures and pages to sign); and a step 100 of signing credentials after successfully generating the credentials using, for example, a Merkle Proof. Persons skilled in the art will appreciate that Merkle Proofs are used, among other things, to decide upon whether the data belongs to the Merkle tree, to concisely prove the validity of data being part of a dataset without storing the whole data set, and/or to ensure the validity of a certain data set being inclusive in a larger data set without revealing either the complete data set or its subset.

Generating and Storing Proof Value

Figure 10:
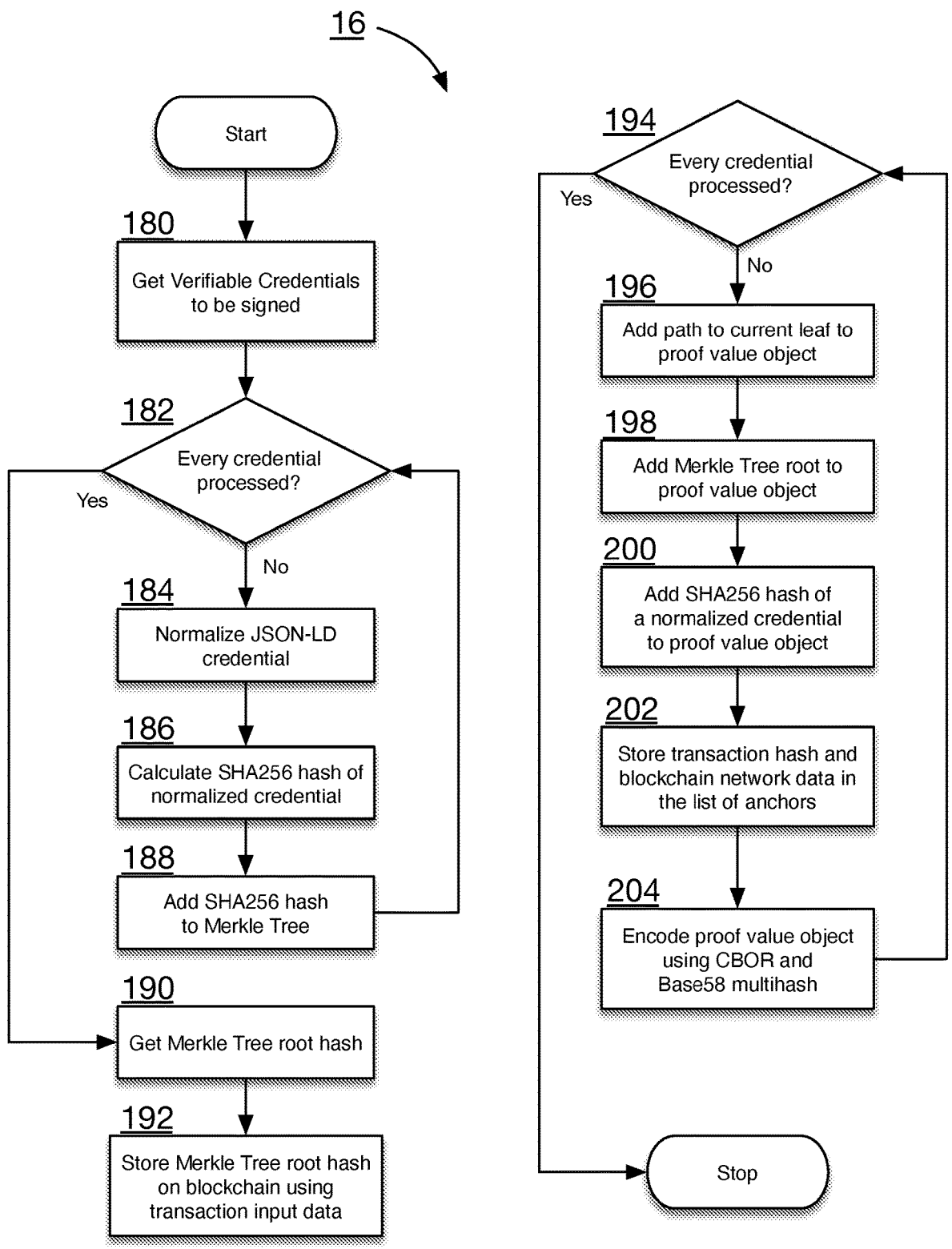
FIG. 10 is a flowchart of a prior art method of signing a verifiable credential.
Figure 11:
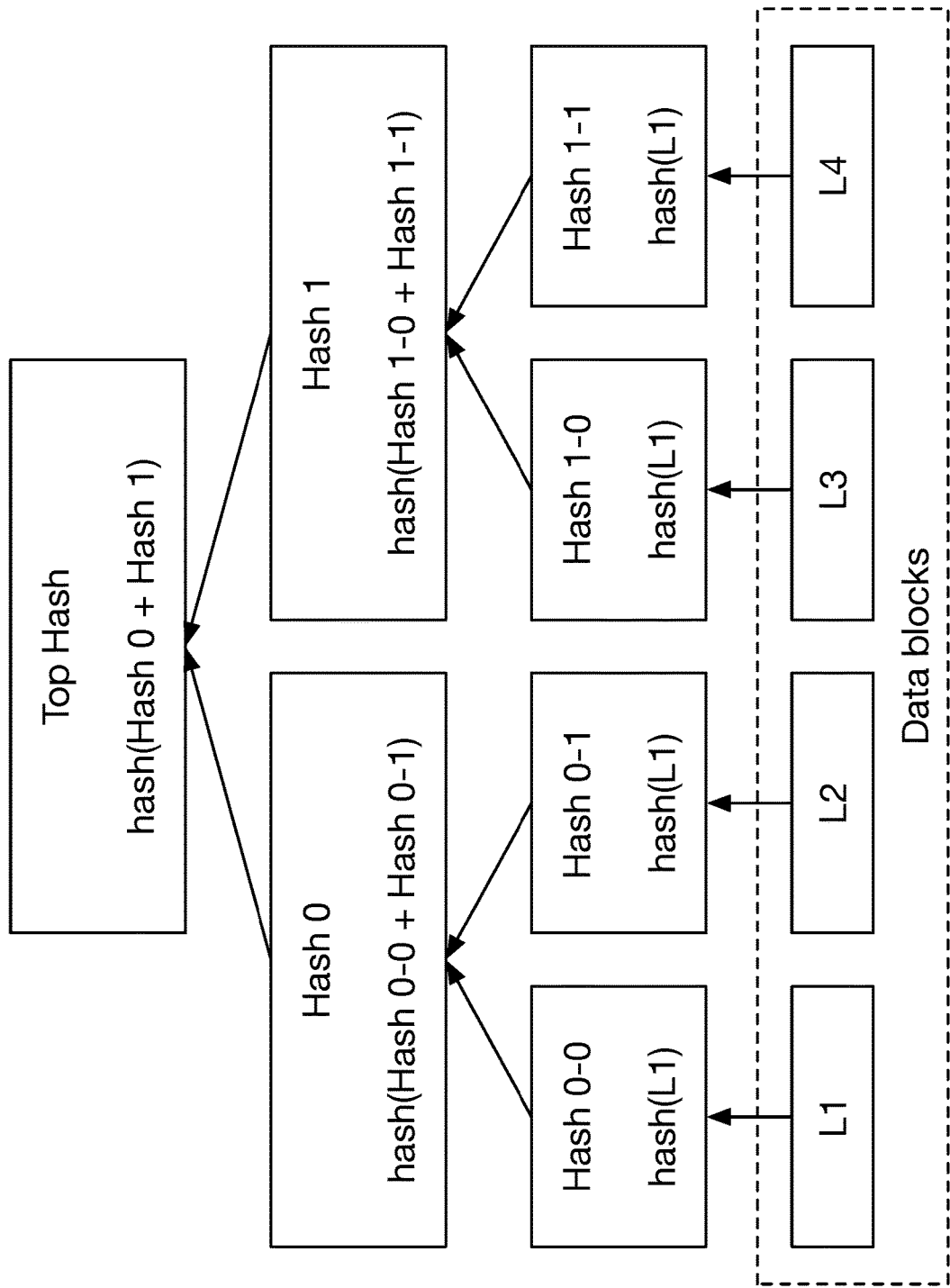
FIG. 11 is a flowchart of a Merkle Tree as known in the prior art.

FIG. 10 depicts a prior art method 16 of signing a verifiable credential. In accordance with a preferred embodiment, the system 300 uses a cryptographic proof generator known in the art (e.g., W3C Merkle Proof 2019 signature suite) to create a cryptographic proof for verifiable credentials, which is adapted to allow storing proof value for multiple credentials using a single blockchain transaction. The method 16 of generating and storing proof value includes: a start step; a step 180 of selecting verifiable credentials to be signed which include credentials that can be logically grouped in a batch (e.g., Signatory Credentials for signing parties of a package of documents) to be used in constructing a Merkle Tree; a step 182 of determining if every credential is processed; if every credential is not processed, a step 184 of normalizing JSON-LD credential (a method of encoding Linked Data using JavaScript Object Notation) using application/nquads format and URDNA2015 algorithm; a step 186 of calculating SHA256 hash of normalized credential; a step 188 of adding a SHA256 hash to Merkle Tree; once every credential is processed and the leaves are added to the Merkle Tree, a step 190 of calculating the Merkle Tree root hash; a step 192 of storing the Merkle Tree root hash on blockchain using transaction input data; a step 194 of determining if every credential has received a proof value; a step 196 of adding a path to current leaf to proof value object; a step 198 of adding Merkle Tree root to proof value object; a step 200 of adding SHA256 hash of a normalized credential to proof value object; a step 202 of storing transaction hash and blockchain network data in the list of anchors (blockchain anchor or multiple anchors if Merkle Tree root hash is stored on multiple blockchains); a step 204 of encoding proof value object using Concise Binary Object Representation ("CBOR"), for example, for compression as described in RFC 7049 and Base58 Multihash. Persons having ordinary skill in the art will appreciate that the Base58 value is a Merkle Proof 2019 proof value. FIG. 11 depicts a Merkle tree in accordance with the prior art.

In a preferred embodiment, when the assignment of the signatories is completed, every signatory is granted a permission to sign the document (as stated in the credential subject). The signatories are preferably notified using a preferred and/or predetermined communication method (as stated in the credential subject) that may also used as login information. If the signatory is a new user of the system 300, upon account creation a linking of the blockchain wallet to the account occurs by re-encrypting the wallet using user's password. The account creation method 20 depicted in FIG. 9 is preferably performed after that.

Verification of Signatory Identity

Once the signature fields have been placed, the signatory is required to mark them by performing a mouse click, a finger tap, or any other predetermined input method to acknowledge the placing of the signature, date timestamp, name, or other types of initials and marks. In accordance with a preferred embodiment, to proceed and apply these signature marks to the document and issue Signature Credentials, the signatory must confirm his/her identity by performing a biometric verification using the same method used in KYC identity verification. In one embodiment, facial biometrics are used to ease post-signing verification of the signatory by a human third-party verifier. Persons of ordinary skill in the art will appreciate that other forms of identity verification may be used.

Figure 5:
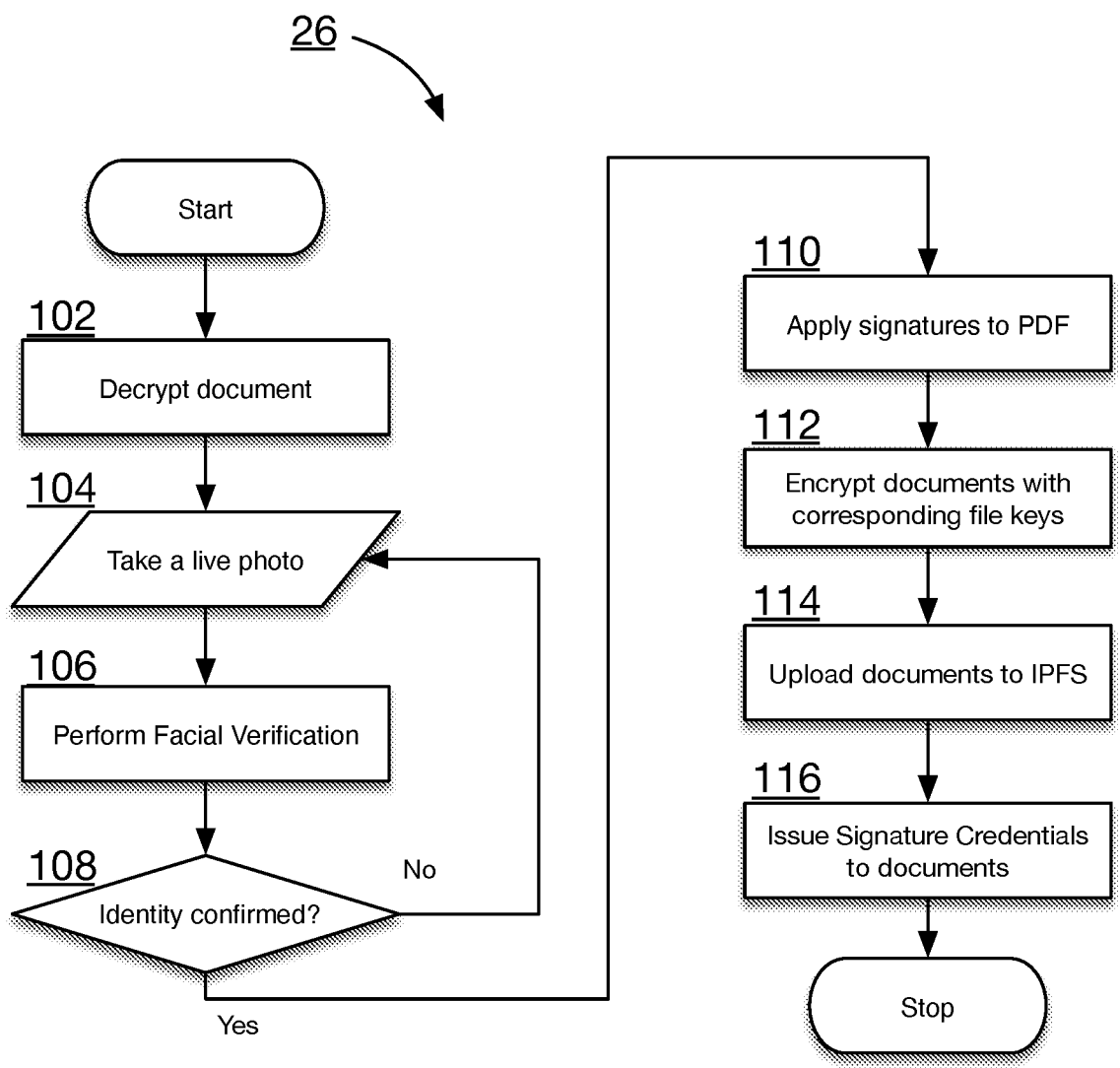
FIG. 5 is a flowchart of a method of signing documents using identity verification prior to completion of the signing in accordance with a preferred embodiment.

In accordance with a preferred embodiment, a signatory (or user) unlocks the blockchain wallet using the associated password to sign a document. FIG. 5 depicts steps of a method 26 of signing documents using identity (e.g., facial) verification prior to completion of the signing. In accordance with a preferred embodiment of the present invention, the method 26 includes the following steps: a start step; a step 102 of decrypting the document by the signatory, including using the shared secret as a passphrase to decrypt the file key using an AES-256 algorithm of the document and the document itself using the resulting file key as a passphrase and the AES-256 algorithm; a step 104 of taking a live photo of the signatory (or user) using, for example, a computer web camera or mobile camera; a step 106 of performing facial verification by comparing the live photo with a photo associated with the KYC profile of the user using, for example, artificial intelligence, manual review and/or other methods known in the art to provide a measurable level of certainty in identity matching; a step 108 of determining if the identity of the user has been confirmed; if the identity of the user is confirmed, a step 110 of applying signatures to an electronic document (e.g., PDF); a step 112 of encrypting documents with corresponding file keys and the AES-256 algorithm; a step 114 of storing on a decentralized storage, for example, uploading documents to IPFS; and a step 116 of issuing Signature Credentials to documents and/or every file.

Persons having ordinary skill in the art will appreciate that individuals can change their appearance such as, for example, by wearing eye-glasses, make-up, headdress, facial hair, etc. Accordingly, a predetermined level of identity verification confidence must be selected (e.g., a recommended threshold of confidence is typically equal to or greater than about 90%). If a user fails identity confirmation verification due to reasons including, but not limited to, multiple faces found on the photo or low level of confidence, the signatory may be presented an opportunity to perform a verification again as shown in FIG. 5. The number of attempts can be limited for security purposes.

Issuing Signature Credentials

Figure 6:
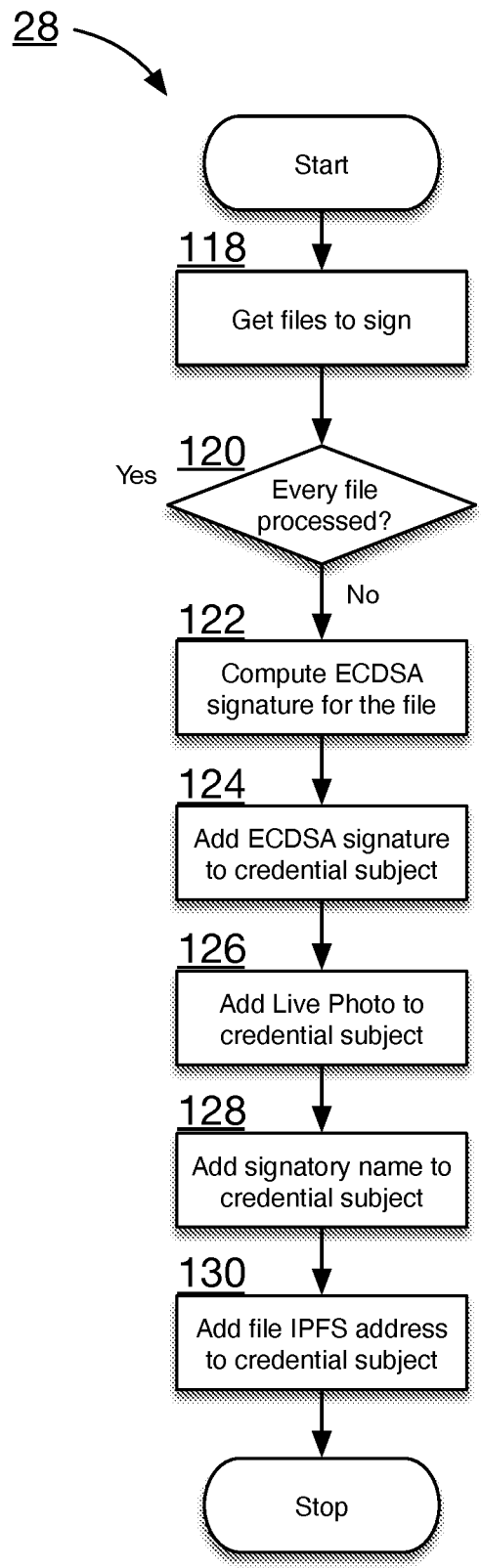
FIG. 6 is a flowchart of a method of issuing a signature credential to a package of documents when signing occurs in accordance with a preferred embodiment.

FIG. 6 depicts steps of a method 28 of issuing a signature credential to a package of documents when signing occurs in accordance with a preferred embodiment. The method 28 includes the following steps: a start step; a step 118 of obtaining files to sign; a step 120 of determining if every file has been processed; for any file not yet processed, a step 122 of computing Elliptic Curve Digital Signature Algorithm ("ECDSA") signature using the blockchain wallet; a step 124 of adding the ECDSA signature, the type of document (e.g., documentType) and/or the location of verification (e.g., verifiedAt), to the credential subject; a step 126 of adding a Live Photo to the credential subject (and/or other desired biometric information) used from the identity confirmation step 104 of FIG. 5; a step 128 of adding signatory name to the credential subject; a step 130 of adding file IPFS address to the credential subject (content-based address of the signed file). Persons skilled in the art will appreciate that in step 124, any other relevant information that facilitates the establishment of a link between the user's identity and the digital signature may be included. In preferable embodiments, the credential is then signed using the method 16 as depicted in FIG. 10.

Issuing Authenticity Report Credentials

Figure 7:
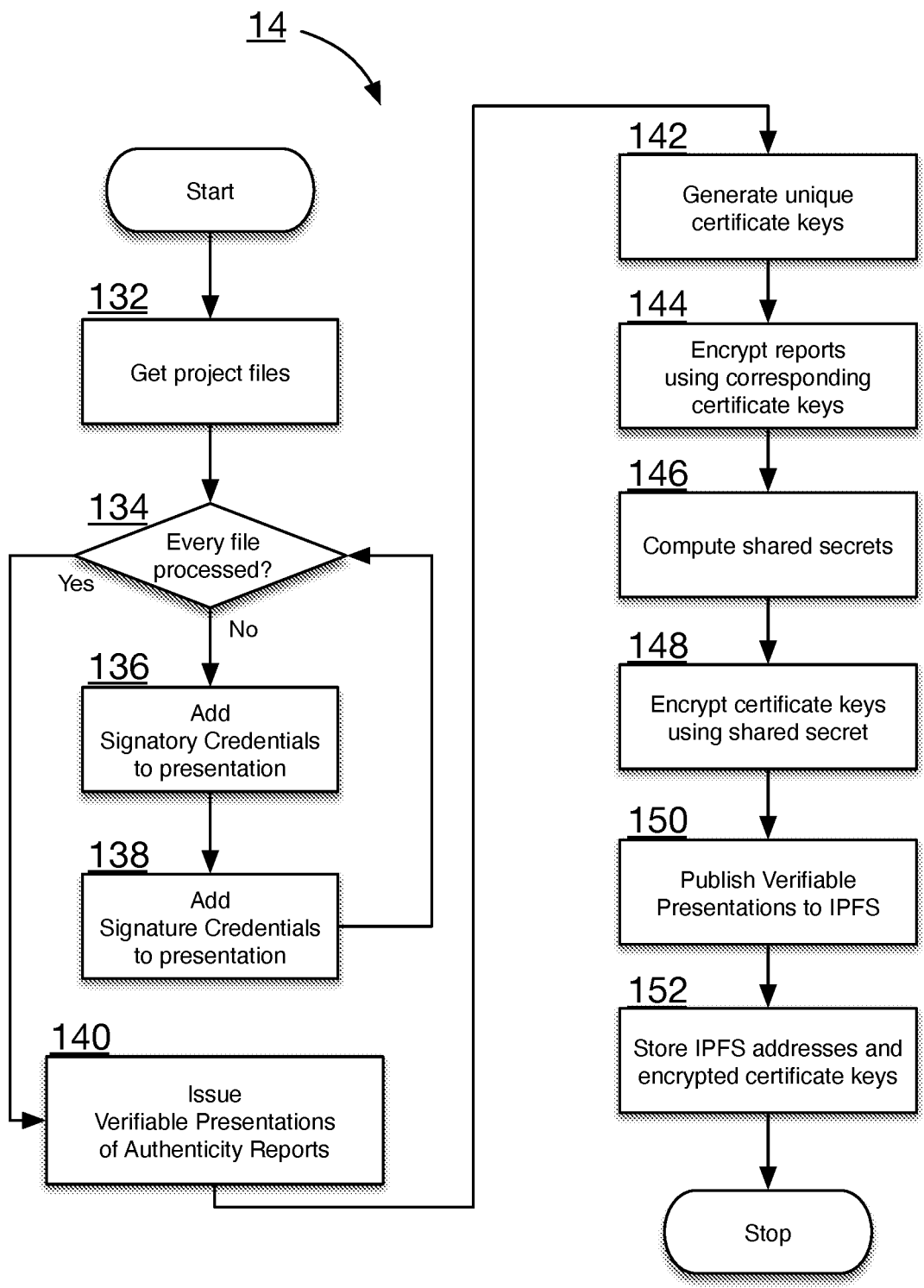
FIG. 7 is a flowchart of a method of issuing an authenticity report for the document after all counterparties have signed it in accordance with a preferred embodiment.

In a preferred embodiment, once every signatory has signed the documents package using their respective Signature Credential, the package is certified by the administrator subsystem 340. FIG. 7 depicts the steps of a method 14 of issuing an authenticity report 350 for a document after all counterparties have signed it in accordance with a preferred embodiment. The method 14 includes the following steps: a start step; a step 132 of obtaining the project files in the document package; a step 134 of determining if every file is processed; if any file is not processed, a step 136 of adding Signatory Credentials to the presentation or list of the verifiable credentials and a step 138 of adding Signature Credentials to the presentation or list of the verifiable credentials; if the files are processed, a step 140 of issuing verifiable presentations that represent authenticity reports for document authenticity verification for each document (in preferable embodiments, the credential is then signed using the method 16 as depicted in FIG. 10); a step 142 of generating unique certificate keys for each signing party, or document package sender, for report encryption; a step 144 of encrypting reports using corresponding certificate keys as a passphrase and an AES-256 algorithm; a step 146 of computing shared secrets calculated between the system's blockchain wallet and signing party's or document package sender's wallet using an Elliptic-curve Diffie-Hellman ("ECDH") protocol as a passphrase; a step 148 of encrypting certificate keys using the shared secrets; a step 150 of publishing verifiable presentations to a decentralized storage (e.g., IPFS); and a step 152 of storing addresses of the encrypted files on the decentralized storage (e.g., IPFS) and encrypted certificate keys.

Applying Authenticity Report Credentials to Exported Documents

Figure 8:
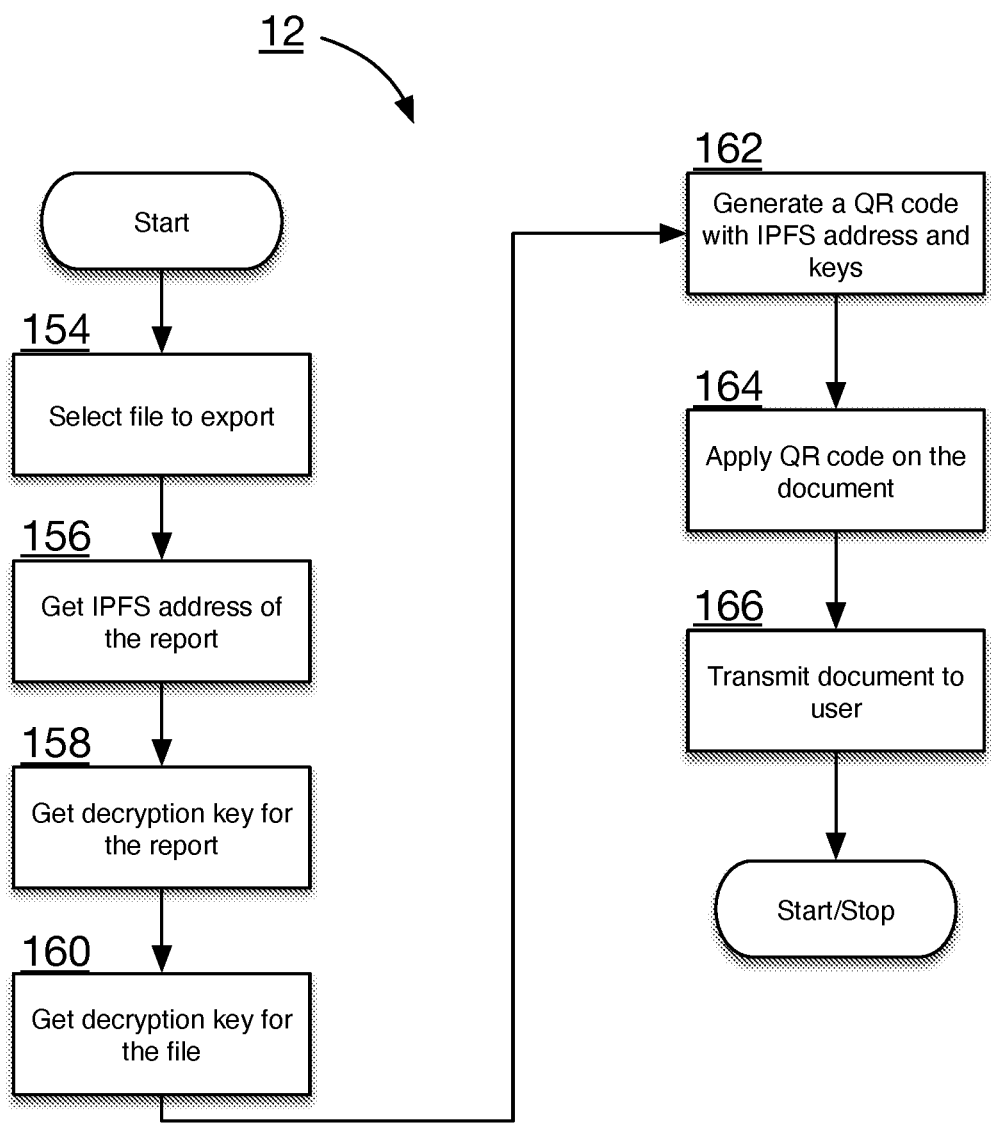
FIG. 8 is a flowchart of a method of issuing an authenticity report credentials to a package of documents when the signing is complete in accordance with a preferred embodiment.

In accordance with a preferred embodiment, signed documents may be exported from the system 300 for further digital distribution or printing hard copies. FIG. 8 depicts steps of a method 12 for applying authenticity report credentials to a single document when the signing is complete in accordance with a preferred embodiment. The method 12 includes the following steps: a start step; a step 154 of selecting a file (e.g., by a user) to export to initiate the process; a step 156 of obtaining the corresponding Authenticity Report's decentralized storage address (IPFS address); a step 158 of obtaining the decryption or certificate key for the report; a step 160 of obtaining the decryption key for the file; a step 162 of generating a machine readable code (e.g., QR code, barcode) with IPFS address and keys; a step 164 of applying the machine readable code to the document for export; a step 166 of transmitting the document associated with the applied machine readable code to the user for printing or digital distribution. In preferable embodiments, the user's wallet is used to calculate ECDH shared secrets and decrypt the corresponding encrypted certificate key and file key, stored by the system to obtain the keys for steps 158 and 160.

Figure 12A:
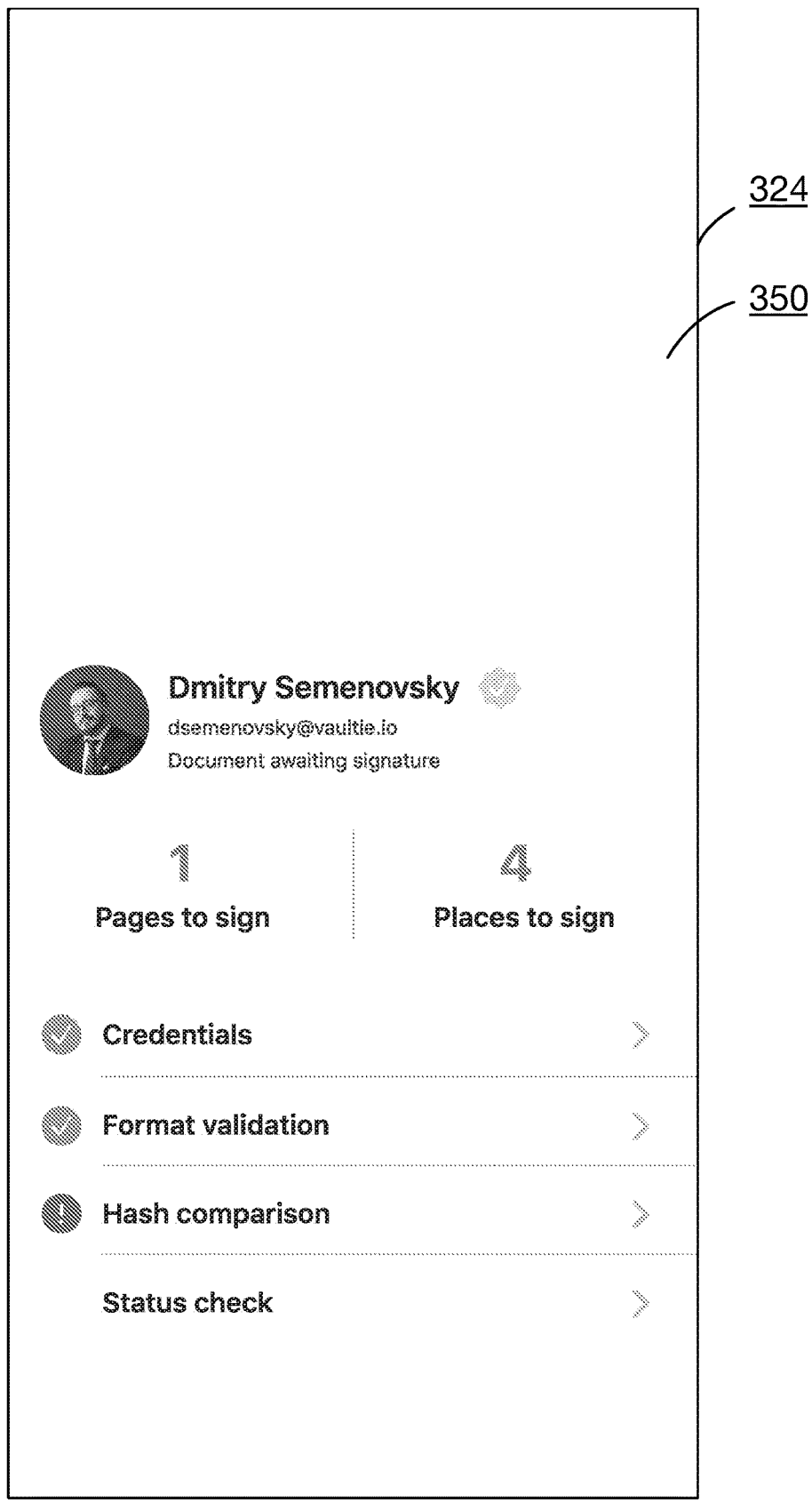
FIGS. 12A and 12B are illustrations of an authenticity report being decoded and verified, respectively, from a machine readable code on a signed document.

In accordance with a preferred embodiment, the verification of the document is performed by scanning the machine readable code (e.g., barcode) associated with the document and verifying the encoded information, contained in the Verifiable Credentials and Verifiable Presentation according to, for example, W3C Merkle Proof specification, as depicted in FIGS. 12A and B in which an authenticity report is decoded from a QR code on a signed or unsigned document. The machine readable code data is parsed to obtain the decentralized address of the report, which is downloaded and decrypted using a certificate key. After decryption, the report and the contained verifiable credentials are subject to Merkle Proof validation to ensure the integrity and validity of the records, authorization to sign document, and identity of the signatory using a contained photo and/or a verified identity indicator (e.g., a badge depicting, or plain text confirming, a verified passport of the user or some other verified identity document, for example, a driver's license, a national identification card, or other forms of government-issued identification) adapted to provide additional information on document type to facilitate identity verification and the date of verification. Since the references to the documents are included as a part of a credential certificate, establishing of integrity of the document can be performed by decrypting and previewing the contents of the document, stored on a decentralized storage and comparing them with the copy. The ECDSA cryptographic signature of the document is also verified using the decrypted document data, ECDSA signature contained in the credential and the DID Document, which contains public key of the signatory.

As shown in FIG. 12A, in accordance with a preferred embodiment, a user input-output device 324 presents an authentication report 350 in the process of verification, which includes information on, among other things, the progress of verification, the total number of pages, number of signatories, name and contact information of signatory, status of document signature, number of pages to sign, number of places to sign, credentials, format validation, hash comparison, status check, and an option to view the original PDF.

Figure 12B:
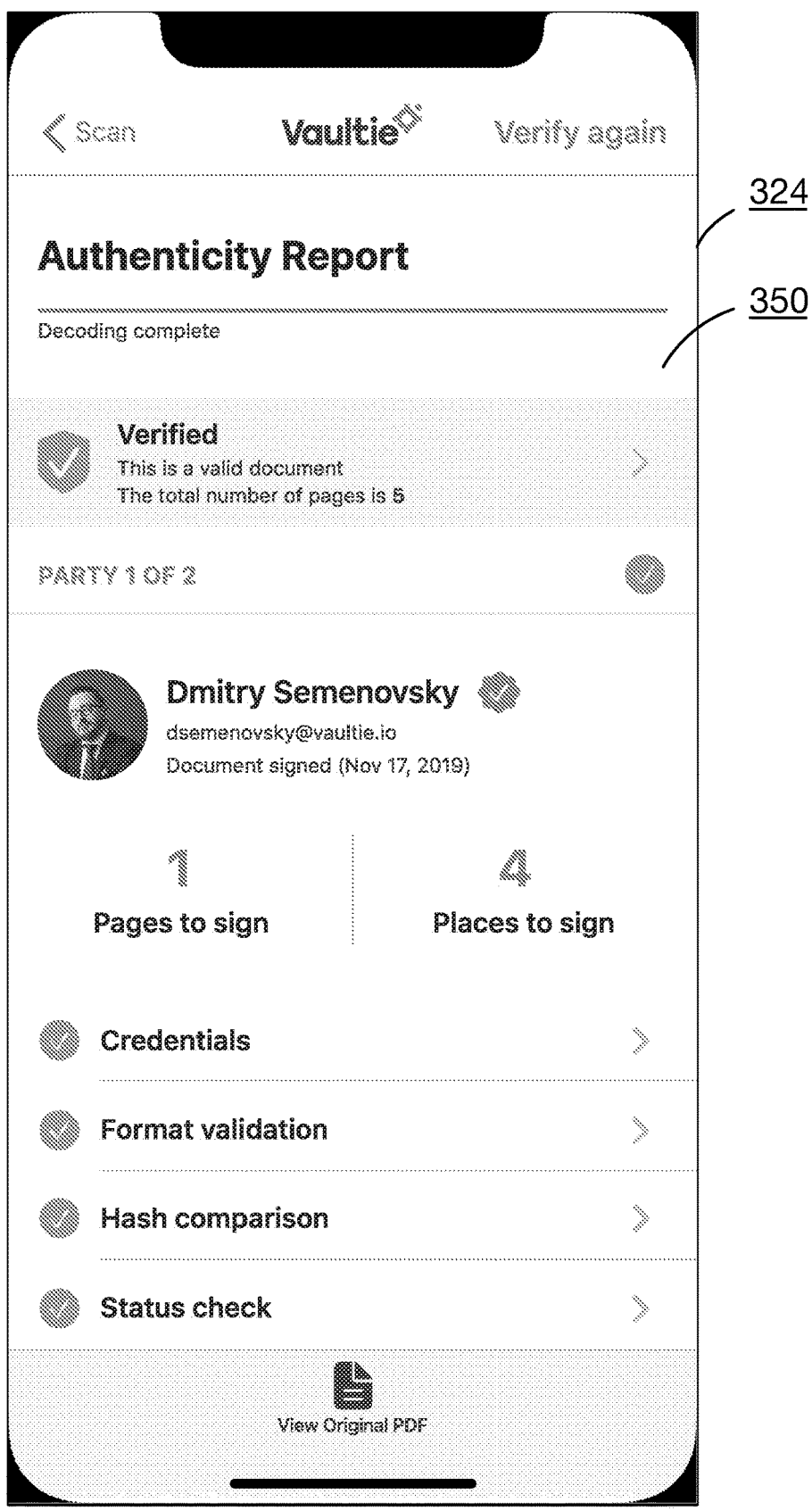

FIG. 12B depicts a user input-output device 324 presenting a verified authentication report 350, which includes information on, among other things, the verification status of the document (e.g., "Verified", "This is a valid document"), the total number of pages, number of signatories, name and contact information of signatory, status of identity verification for the signatory, status of document signature, number of pages to sign, number of places to sign, credentials, format validation, hash comparison, status check, signature status of other signatories, and an option to view the original PDF.

The present invention preferably provides a method of associating a person (alternately "user" or "signatory") to an authenticated document that is immediately verifiable by third parties. The method, preferably includes the steps of using: (1) a KYC process to verify the signatory prior to signature; (2) facial comparison using AI to authenticate the user at the moment of applying signature; (3) the application of signature marks to the document when referencing it on Blockchain; (4) use of Blockchain to store the evidence of the signature and permanently store Merkle Root Proof of he corresponding Credential that includes the photograph of the signatory at the moment of signing; and (5) use of Blockchain references and machine readable code (e.g., QR Code) that links the hard copy to an audit trail and original document. The foregoing method facilitates full-cycle authentication of the document, the signature and the signatory.

In the prior art, the most commonly used PKI approach, where the signing keys are issued by a centralized certified authority. In contrast, the present invention preferably uses Blockchain wallets (i.e., private-public key pairs) to encrypt the document on a peer-to-peer basis between signatories so only authorized (i.e., predetermined) parties can sign and read these sensitive documents.

When a user signs up to the authentication system a wallet (e.g., an Ethereum wallet) is created and associated with the user's profile as well as identity verification record. The wallets are linked to the user's profile which contains KYC verification to de-anonymize the Blockchain wallets. Persons skilled in the art will appreciate that it is possible to determine the Government identification used to put a certain transaction to Blockchain.

Before signing any documents, users are required to verify their identity using government-issued identification and, for example, a Live Photo (i.e., a "selfie"). Persons skilled in the art will appreciate that the present invention is not limited to facial authentication methods and that alternate embodiments may include alternate methods of identity verification (e.g., fingerprint matching on a government-issued identification). The authentication system preferably uses an identity verification provider (e.g., Onfido), which is well adopted and trusted by banks and other financial institutions across North America and the United Kingdom. In a preferred embodiment, once the user verifies their identity, the system allows the user to start signing the documents using the wallet as cryptographic key pair and Blockchain account that is linked to the KYC profile of the user.

During the signature of any document on the authentication platform, part of the process is to confirm a signature with an additional Live Photo or one or more other biometric identification methods. When the user takes a selfie, the system compares this selfie with the selfie on the KYC profile (using a Facial Comparison AI provider, e.g., Face++). If the person on the selfie matches the person on the KYC profile, the system allows them to enter the password as the final verification factor.

By comparing the current selfie to the photo of the user taken earlier on (which was compared to the Government issued identification), the system preferably confirms that the person who is signing the document is in fact the authenticated individual who owns the account.

In accordance with an embodiment, after the system collects this data, it: (i) encrypts the document using wallets as key pairs between signatories; (ii) stores the encrypted version on a decentralized filesystem (e.g., IPFS, a filesystem that supports automatic data replication for high availability, fault tolerance and self-healing); (iii) stores the references (e.g., IPFS address, which at the same time is a checksum of encrypted contents) to Blockchain; and (iv) stores the checksum of the selfie of a signatory to Blockchain in the transaction that witnesses the fact of the signing.

During the execution of a Blockchain SmartContracts algorithm in accordance with a preferred embodiment, the validity of the keys is verified by the SmartContracts algorithm and Blockchain itself basing on the following factors: (i) an Invalid key is not able to sign a transaction (i.e., it will not be accepted by Blockchain); (ii) the system's SmartContracts (Blockchain executed) are written in a way to authenticate the wallet and make sure that it belongs to the authentication system network and is linked to a KYC profile; and (iii) the system's SmartContracts also verify if the user has rights to sign the document (i.e., when a signatory is assigned, only a specific Ethereum address can sign the document to prevent tampering the signature on the core level). These steps preferably leads to indisputable signature authentication.

The invention is, in a preferred embodiment, a culmination of the following factors, which lead to a fully authenticatable electronic signature: (i) Create a Blockchain wallet on a Blockchain that supports SmartContracts and associate it to email/password account; (ii) reference the wallet as member of the system; (iii) add a successfully completed KYC identity verification profile to email/password user account; (iv) take the file that needs to be signed; (v) encrypt it using desired user wallets, which grants access only to them; (vi) store the encrypted version; (vii) store the checksum of the version in SmartContract using a blockchain transaction; (viii) store the signatories wallet addresses in SmartContract using a blockchain transaction; (ix) decrypt the document using one of the signatory wallets; (x) take selfie of the signatory and compare it with the selfie on KYC profile via AI; (xi) apply signature marks when needed to the document; (xii) calculate and store electronic signature of the document using user's wallet; (xiii) encrypt it using signatories wallets; (xiv) store the encrypted version; (xv) store the checksum of the version in SmartContract using a blockchain transaction; (xvi) store the checksum of the selfie picture in SmartContract using a blockchain transaction; (xvii) decrypt the document using one of the signatory wallets; (xviii) apply the QR code that contains a link to the audit trail and a checksum to verify its validity on each page; (xix) present audit trail when accessing the link from QR, which contains: (a) number of pages in the original document, (b) faces of the signatories, (c) identity verification timestamp, (d) Blockchain transaction references to the transaction that stores selfie picture checksum (Signature transaction), (e) electronic signature of the signed document version, and (f) signature timestamp.

While prior art systems and/or methods may have disclosed online authentication using blockchain for signing contracts, these prior art systems and/or methods do not include the application of biometric user data to authenticate the user including, for example, the application of blockchain wallets.

System

The present disclosure may be described herein with reference to system architecture, block diagrams and flowchart illustrations of methods, and computer program products according to various aspects of the present disclosure. It may be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flow diagram illustrations support combinations of means for performing the specified functions, combinations of steps for performing the specified functions, and program instruction means for performing the specified functions. It may also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

The present disclosure may now be described in terms of an exemplary system in which the present disclosure, in various embodiments, would be implemented. This may be for convenience only and may be not intended to limit the application of the present disclosure. It may be apparent to one skilled in the relevant art(s) how to implement the present disclosure in alternative embodiments.

In this disclosure, a number of terms and abbreviations may be used. The following definitions and descriptions of such terms and abbreviations are provided in greater detail.

Preferred embodiments of the present invention can be implemented in numerous configurations depending on implementation choices based upon the principles described herein. Various specific aspects are disclosed, which are illustrative embodiments not to be construed as limiting the scope of the disclosure. Although the present specification describes components and functions implemented in the embodiments with reference to standards and protocols known to a person skilled in the art, the present disclosures as well as the embodiments of the present invention are not limited to any specific standard or protocol. Each of the standards for non-mobile and mobile computing, including the Internet and other forms of computer network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

As those of ordinary skill in the art would generally understand, the Internet is a global computer network which comprises a vast number of computers and computer networks which are interconnected through communication links. A person skilled in the relevant art may understand that an electronic communications network of the present invention, may include, but is not limited to, one or more of the following: a local area network, a wide area network, peer-to-peer communication, an intranet, or the Internet. The interconnected computers exchange information using various services, including, but not limited to, electronic mail, Gopher, web-services, application programming interface ("API"), File Transfer Protocol ("FTP"). This network allows a server computer system (a Web server) to send graphical Web pages of information to a remote client computer system. The remote client computer system can then display the Web pages via its web browser. Each Web page (or link) of the "world wide web" ("WWW") is uniquely identifiable by a Uniform Resource Locator ("URL"). To view a specific Web page, a client computer system specifies the URL for that Web page in a request (e.g., a HyperText Transfer Protocol ("HTTP") request). The request is forwarded to the Web server that supports the Web page. When the Web server receives the request, it sends the Web page to the client computer system. When the client computer system receives the Web page, it typically displays the Web page using a browser. A web browser or a browser is a special-purpose application program that effects the requesting of web pages and the displaying of web pages and the use of web-based applications. Commercially available browsers include Microsoft Internet Explorer and Firefox, Google Chrome among others. It may be understood that with embodiments of the present invention, any browser would be suitable.

Web pages are typically defined using HTML. HTML provides a standard set of tags that define how a Web page is to be displayed. When a provider indicates to the browser to display a Web page, the browser sends a request to the server computer system to transfer to the client computer system an HTML document that defines the Web page. When the requested HTML document is received by the client computer system, the browser displays the Web page as defined by the HTML document. The HTML document contains various tags that control the displaying of text, graphics, controls, and other features. The HTML document may contain URLs of other Web pages available on that server computer system or other server computer systems.

A person skilled in the relevant art may generally understand a web-based application refers to any program that is accessed over a network connection using HTTP, rather than existing within a device's memory. Web-based applications often run inside a web browser or web portal. Web-based applications also may be client-based, where a small part of the program is downloaded to a user's desktop, but processing is done over the Internet on an external server. Web-based applications may also be dedicated programs installed on an internet-ready device, such as a smart phone or tablet. A person skilled in the relevant art may understand that a web site may also act as a web portal. A web portal may be a web site that provides a variety of services to users via a collection of web sites or web based applications. A portal is most often one specially designed site or application that brings information together from diverse sources in a uniform way. Usually, each information source gets its dedicated area on the page for displaying information (a portlet); often, the user can configure which ones to display. Portals typically provide an opportunity for users to input information into a system. Variants of portals include "dashboards". The extent to which content is displayed in a "uniform way" may depend on the intended user and the intended purpose, as well as the diversity of the content. Very often design emphasis is on a certain "metaphor" for configuring and customizing the presentation of the content and the chosen implementation framework and/or code libraries. In addition, the role of the user in an organization may determine which content can be added to the portal or deleted from the portal configuration.

It may be generally understood by a person skilled in the relevant art that the term "mobile device" or "portable device" refers to any portable electronic device that can be used to access a computer network such as, for example, the internet. Typically, a portable electronic device comprises a display screen, at least one input/output device, a processor, memory, a power module and a tactile man-machine interface as well as other components that are common to portable electronic devices individuals or members carry with them on a daily basis. Examples of portable devices suitable for use with the present invention include, but are not limited to, smart phones, cell phones, wireless data/email devices, tablets, etc.

It may be further generally understood by a person skilled in the relevant art that the term "downloading" refers to receiving datum or data to a local system (e.g., mobile device) from a remote system (e.g., a client) or to initiate such a datum or data transfer. Examples of a remote systems or clients from which a download might be performed include, but are not limited to, web servers, FTP servers, email servers, or other similar systems. A download can mean either any file that may be offered for downloading or that has been downloaded, or the process of receiving such a file. A person skilled in the relevant art may understand the inverse operation, namely sending of data from a local system (e.g., mobile device) to a remote system (e.g., a database) may be referred to as "uploading". The data and/or information used according to the present invention may be updated constantly, hourly, daily, weekly, monthly, yearly, etc. depending on the type of data and/or the level of importance inherent in, and/or assigned to, each type of data. Some of the data may preferably be downloaded from the Internet, by satellite networks or other wired or wireless networks.

Elements of the present invention may be implemented with computer systems which are well known in the art. Generally speaking, computers include a central processor, system memory, and a system bus that couples various system components including the system memory to the central processor. A system bus may be any of several types of bus structures including a memory bus or memory controller, a peripheral bus, and a local bus using any of a variety of bus architectures. The structure of a system memory may be well known to those skilled in the art and may include a basic input/output system ("BIOS") stored in a read only memory ("ROM") and one or more program modules such as operating systems, application programs and program data stored in random access memory ("RAM"). Computers may also include a variety of interface units and drives for reading and writing data. A user of the system can interact with the computer using a variety of input devices, all of which are known to a person skilled in the relevant art.

One skilled in the relevant art would appreciate that the device connections mentioned herein are for illustration purposes only and that any number of possible configurations and selection of peripheral devices could be coupled to the computer system.

Computers can operate in a networked environment using logical connections to one or more remote computers or other devices, such as a server, a router, a network personal computer, a peer device or other common network node, a wireless telephone or wireless personal digital assistant. The computer of the present invention may include a network interface that couples the system bus to a local area network ("LAN"). Networking environments are commonplace in offices, enterprise-wide computer networks and home computer systems. A wide area network ("WAN"), such as the Internet, can also be accessed by the computer or mobile device.

It may be appreciated that the type of connections contemplated herein are exemplary and other ways of establishing a communications link between computers may be used in accordance with the present invention, including, for example, mobile devices and networks. The existence of any of various well-known protocols, such as TCP/IP, Frame Relay, Ethernet, FTP, HTTP and the like, may be presumed, and computer can be operated in a client-server configuration to permit a user to retrieve and send data to and from a web-based server. Furthermore, any of various conventional web browsers can be used to display and manipulate data in association with a web based application.

The operation of the network ready device (i.e., a mobile device) may be controlled by a variety of different program modules, engines, etc. Examples of program modules are routines, algorithms, programs, objects, components, data structures, etc. that perform particular tasks or implement particular abstract data types. It may be understood that the present invention may also be practiced with other computer system configurations, including multiprocessor systems, microprocessor-based or programmable consumer electronics, network PCS, personal computers, minicomputers, mainframe computers, and the like. Furthermore, the invention may also be practiced in distributed computing environments where tasks are performed by remote processing devices that are linked through a communications network. In a distributed computing environment, program modules may be located in both local and remote memory storage devices.

Embodiments of the present invention may implement Artificial Intelligence ("AI") or machine learning ("ML") algorithms. AI and ML algorithms are general classes of algorithms used by a computer to recognize patterns and may include one or more of the following individual algorithms: nearest neighbor, naive Bayes, decision trees, linear regression, principle component analysis ("PCA"), support vector machines ("SVM"), evolutionary algorithms, and neural networks. These algorithms may "learn" or associate patterns with certain responses in several fashions, including: supervised learning, unsupervised learning, semi-supervised learning, and reinforcement learning.

Embodiments of the present invention can be implemented by a software program for processing data through a computer system. It may be understood by a person skilled in the relevant art that the computer system can be a personal computer, mobile device, notebook computer, server computer, mainframe, networked computer (e.g., router), workstation, and the like. In one embodiment, the computer system includes a processor coupled to a bus and memory storage coupled to the bus. The memory storage can be volatile or non-volatile (i.e., transitory or non-transitory) and can include removable storage media. The computer can also include a display, provision for data input and output, etc. as may be understood by a person skilled in the relevant art.

Some portion of the detailed descriptions that follow are presented in terms of procedures, steps, logic block, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc. is here, and generally, conceived to be a self-consistent sequence of operations or instructions leading to a desired result. The operations are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers or the like.

While computer-readable storage medium may be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

It may generally be understood by a person skilled in the relevant art that the term "cloud computing" is an information technology model that facilitates ubiquitous access to shared pools of configurable system resources and higher-level services that can be provisioned with minimal management effort, usually over the Internet. Third-party clouds preferably enable organizations to focus on their core businesses instead of allocating resources on computer infrastructure and maintenance.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

This concludes the description of presently preferred embodiments of the invention. The foregoing description has been presented for the purpose of illustration and is not intended to be exhaustive or to limit the invention to the precise form disclosed. Other modifications, variations and alterations are possible in light of the above teaching and will be apparent to those skilled in the art, and may be used in the design and manufacture of other embodiments according to the present invention without departing form the spirit and scope of the invention. It is intended the scope of the invention be limited not by this description but only by the claims forming a part hereof.

What is claimed is:

1. A system for authenticating a digitally signed document by one or more users, wherein the system comprises:
 (a) a user processor, local to the one or more users, operative to execute a user facing application to collect and transmit user data associated with the one or more users; the user data including verified user identity data, and real time user biometric data, the user facing application operative to create a verified user account by generating an encrypted wallet, and a decentralized identifier ("DID") associated with a blockchain address assigned to the encrypted wallet and the verified user account, the user processor further operative to (i) generate a unique file key for the document, (ii) encrypt the document with the corresponding unique file key, (iii) if no encrypted wallets exists for the one or more users, the user facing application to generate an encrypted wallet for the one or more users; and (iv) generate a shared secret between the encrypted wallets for the one or more users;
 (b) a Know Your Customer ("KYC") Provider subsystem comprising: (i) a KYC Provider database containing verified user identity data associated with the one or more users; and (ii) a KYC Provider processor operative to electronically receive the real time user biometric data from the user processor, the real time user biometric data obtained from the one or more users, and to automatically compare the real time user biometric data and the verified user identity data to generate a KYC Provider report;
 (c) an administrator processor operative to electronically receive the user data from the user processor and the KYC Provider report from the KYC Provider processor and to automatically: (i) inspect the KYC Provider report to verify the identity of the one or more users; (ii) if the identity of the one or more users is verified, apply a digital signature of the one or more users to the document, the digital signature generated from the user data associated with the one or more users; (iii) issue an authenticity report associated with the digitally signed document, the authenticity report including an audit trail providing indications confirming the identity of the one or more user with an identity verification timestamp and the real time user biometric data and confirming the application of the digital signature by the one or more users to the document with a signature transaction and a signature timestamp; and (iv) publish the authenticity report to a database.

2. The system according to claim 1, wherein the database is a decentralized storage.

3. The system according to claim 1, further comprising a biometric reader operative to capture, from the one or more users, the real time user biometric data associated with the one or more users.

4. The system according to claim 1, wherein the user data is encrypted.

5. The system of claim 1, wherein the digitally signed document is encrypted with the unique file key.

6. The system of claim 1, wherein at least one of the user processor, the KYC Provider processor and the administrator processor are operative to at least one of automatically encrypt and decrypt the user data.

7. A method for authenticating a digitally signed document by one or more users, wherein the method comprises the steps of:
 (a) operating a user processor, local to the one or more users, to execute a user facing application to collect and transmit user data associated with the one or more users, the user data including verified user identity data, and real time user biometric data;
 (b) creating a verified user account using the user facing application to (i) generate an encrypted wallet, and (ii) generate a decentralized identifier ("DID") associated with a blockchain address assigned to the encrypted wallet and the verified user account;
 (c) processing a document, wherein the user processor is further operative to (i) generate a unique file key for the document, (ii) encrypt the document with the corresponding unique file key, (iii) if no encrypted wallets exists for the one or more users, generate an encrypted wallet for the one or more users; and (iv) generate a shared secret between the encrypted wallets for the one or more users;
 d) using a Know Your Customer ("KYC") Provider subsystem comprising:
  (i) a KYC Provider database containing verified user identity data associated with the one or more users; and (ii) a KYC Provider processor to electronically receive the real time user biometric data from the user processor, the real time user biometric data obtained from the one or more users, and to automatically compare the real time user biometric data and the verified user identity data to generate a KYC Provider report;
 e) operating an administrator processor to electronically receive the user data from the user processor and the KYC Provider report from the KYC Provider processor and to automatically: (i) inspect the KYC Provider report to verify the identity of the one or more users; (ii) if the identity of the one or more users is verified, apply a digital signature of the one or more users to the document, the digital signature generated from the user data associated with the one or more users; (iii) issue an authenticity report associated with the digitally signed document the authenticity report including an audit trail providing indications confirming the identity of the one or more user with an identity verification timestamp and the real time user biometric data and confirming the application of the digital signature by the one or more users to the document with a signature transaction and a signature timestamp; and (iv) publish the authenticity report to a database.

8. The method of claim 7, wherein in step (e), the database is a decentralized storage.

9. The method of claim 7, wherein in step (a), a biometric reader is operated to capture, from the one or more users, the real time user biometric data associated with the one or more users.

10. The method of claim 7, wherein in at least one of step (a) the user processor, in step (d) the KYC Provider processor and in step (e) the administrator processor are operative to at least one of automatically encrypt and decrypt the user data.

11. The method of claim 7, further comprising a step of generating a signatory credential comprising at least one of an Elliptic Curve Digital Signature Algorithm ("ECDSA") signature of the one or more users, a type of document, a location of verification, the real time user biometric data of the one or more users, name of the one or more users, and a blockchain address of the document.

12. The method of claim 7, wherein in step (d), the authenticity report is encrypted with a unique certificate key associated with each signing user of the digitally signed document.

13. The system according to claim 1, wherein the signature transaction includes the checksum of real time user biometric data of the one or more users that signed the digitally signed document stored in blockchain.

14. The system of claim 1, wherein the authenticity report is encrypted with a unique certificate key associated with each signing user of the digitally signed document.

15. The method of claim 7, wherein the signature transaction includes the checksum of real time user biometric data of the one or more users that signed the digitally signed document stored in blockchain.

16. The method of claim 7, wherein the digitally signed document is encrypted with the unique file key.

17. A non-transitory computer readable medium on which is physically stored executable instructions which, upon execution, will authenticate a digitally signed document by one or more users; wherein the executable instructions comprise processor instructions for a user processor to automatically collect and electronically communicate user data associated with the one or more users, the user data including verified user identity data, and real time user biometric data; wherein the executable instructions further comprise processor instructions for a user facing application to create a verified user account by generating an encrypted wallet, and a decentralized identifier ("DID") associated with a blockchain address assigned to the encrypted wallet and the verified user account; the user processor to (i) generate a unique file key for the document, (ii) encrypt the document with the corresponding unique file key, (iii) if no encrypted wallets exists for the one or more users, the user facing application to generate an encrypted wallet for the one or more users; and (iv) generate a shared secret between the encrypted wallets for the one or more users; the user a Know Your Customer ("KYC") Provider processor and an administrator processor, the user data obtained from the one or more users; wherein the executable instructions further comprise processor instructions for the KYC Provider processor to automatically compare the real time user biometric data received from the user processor with the verified user identity data stored in a KYC Provider database and automatically generate a KYC Provider report; and wherein the executable instructions further comprise processor instructions for an administrator processor to automatically inspect the KYC Provider report to verify the identity of the one or more users, if the identity of the one or more users is verified, apply a digital signature of the one or more users to the document, wherein the digital signature generated from the user data associated with the one or more users, issue an authenticity report associated with the digitally signed document, the authenticity report including an audit trail providing indications confirming the identity of the one or more user with an identity verification timestamp and the real time user biometric data and confirming the application of the digital signature by the one or more users to the document with a signature transaction and a signature timestamp, and publish the authenticity report to a database.

18. The non-transitory computer readable medium of claim 17, wherein the database is a decentralized storage.

19. The non-transitory computer readable medium of claim 17, wherein a biometric reader is operated to capture, from the user, the real time user biometric data associated with the one or more users.

20. The non-transitory computer readable medium of claim 17, wherein at least one of the user processor, the KYC Provider processor and the administrator processor are operative to at least one of automatically encrypt and decrypt the user data.

21. The non-transitory computer readable medium of claim 17, wherein the signature transaction includes the checksum of real time user biometric data of the one or more users that signed the digitally signed document stored in blockchain.

22. The non-transitory computer readable medium of claim 17, wherein the digitally signed document is encrypted with the unique file key.

\* \* \* \* \*